United States Patent
Little et al.

(10) Patent No.: US 7,761,703 B2
(45) Date of Patent: Jul. 20, 2010

(54) SYSTEM AND METHOD FOR CHECKING DIGITAL CERTIFICATE STATUS

(75) Inventors: Herbert A. Little, Waterloo (CA); Stefan E. Janhunen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 115 days.

(21) Appl. No.: 10/508,114

(22) PCT Filed: Mar. 20, 2003

(86) PCT No.: PCT/CA03/00403

§ 371 (c)(1), (2), (4) Date: Sep. 17, 2004

(87) PCT Pub. No.: WO03/079626

PCT Pub. Date: Sep. 25, 2003

(65) Prior Publication Data

US 2005/0172128 A1   Aug. 4, 2005

Related U.S. Application Data

(60) Provisional application No. 60/365,518, filed on Mar. 20, 2002.

(51) Int. Cl.
*H04L 29/06* (2006.01)
*H04L 9/32* (2006.01)
(52) U.S. Cl. .................. 713/156; 713/176; 726/10
(58) Field of Classification Search ............ 713/176, 713/156
See application file for complete search history.

(56) References Cited

U.S. PATENT DOCUMENTS

| 6,044,462 | A | * | 3/2000 | Zubeldia et al. ............ 713/158 |
| 6,219,694 | B1 | | 4/2001 | Lazaridis et al. |
| 6,367,013 | B1 | * | 4/2002 | Bisbee et al. ............... 713/178 |
| 6,842,863 | B1 | * | 1/2005 | Fox et al. ...................... 726/5 |
| 6,922,776 | B2 | * | 7/2005 | Cook et al. ................. 713/156 |
| 6,950,933 | B1 | * | 9/2005 | Cook et al. ................. 713/158 |

(Continued)

FOREIGN PATENT DOCUMENTS

EP   0 869 636 A   10/1998
EP   0 942 568 A   9/1999

OTHER PUBLICATIONS

M. Myers et al. "RFC 2560: X.509 Internet Public Key Infrastructure Online Certificate Status Protocol—OCSP" Jun. 1999. IETF. p. 1-23.*
International Search Report of Application No. PCT/CA03/00403, date of mailing Jul. 11, 2003—7pgs.
Online Certificate Status Protocol , Version 2, draft, Mar. 2001 XP-002245769, pp. 1-23.

(Continued)

*Primary Examiner*—Christian LaForgia
(74) *Attorney, Agent, or Firm*—Jones Day; Krishna K. Pathiyal; Robert C. Liang

(57) ABSTRACT

A method and system for handling digital certificate status checks are provided. Digital certificate status request data transmitted from a client system is received at a proxy system. The proxy system generates query data for the digital certificate status in response to receiving the digital certificate status request data. The query data is transmitted to a status provider system, and status data from the status provider system in response to the query data is received at the proxy system. Digital certificate status data based on the status data received is generated by the proxy system and transmitted to the client system.

16 Claims, 11 Drawing Sheets

U.S. PATENT DOCUMENTS

| | | | | |
|---|---|---|---|---|
| 6,970,862 B2* | 11/2005 | Kwan | ............................. | 707/3 |
| 2001/0002485 A1 | 5/2001 | Bisbee et al. | | |
| 2002/0087479 A1* | 7/2002 | Malcolm | ...................... | 705/64 |
| 2002/0143865 A1* | 10/2002 | Tung Loo et al. | ........... | 709/203 |
| 2002/0184182 A1* | 12/2002 | Kwan | ............................. | 707/1 |
| 2003/0065921 A1* | 4/2003 | Chang | ........................ | 713/175 |
| 2003/0079125 A1* | 4/2003 | Hope et al. | .................. | 713/156 |
| 2003/0126433 A1* | 7/2003 | Hui | ............................. | 713/158 |

OTHER PUBLICATIONS

Myers, et al: X.509 Internet Public Key Infrastructure Online Certificate Status Protocol—OCSP, Jun. 1999, XP-002245770, pp. 1-23.

* cited by examiner

SYSTEM AND METHOD FOR CHECKING DIGITAL CERTIFICATE STATUS

This application claims the benefit of U.S. Provisional Patent Application Ser. No. 60/365,518, filed Mar. 20, 2002, the entire disclosure of which is incorporated herein by reference.

BACKGROUND

1. Technical Field

This invention relates generally to the field of secure electronic messaging and in particular to checking the status of digital certificates.

2. Description of the State of the Art

Known secure messaging clients including, for example, e-mail software applications operating on desktop computer systems, maintain a data store, or at least a dedicated data storage area, for secure messaging information such as digital certificates. A digital certificate normally includes the public key of an entity as well as identity information that is bound to the public key with one or more digital signatures. In Secure Multipurpose Internet Mail Extensions (S/MIME) messaging, for example, a public key is used to verify a digital signature on a received secure message and to encrypt a session key that was used to encrypt a message to be sent. In other secure messaging schemes, public keys may be used to encrypt data or messages. If a public key is not available at the messaging client when required for encryption or digital signature verification, then the digital certificate is loaded onto the messaging client before these operations can be performed.

Normally, a digital certificate is checked against a Certificate Revocation List (CRL) to determine if the digital certificate has been revoked by its issuer. This check is typically performed when a digital certificate is first received and periodically thereafter, for example, when a new CRL is received. However, CRLs tend to be relatively bulky, so that transfer of CRLs to messaging clients consumes considerable communication resources, and storage of CRLs at a messaging client occupies significant memory space. CRL-based revocation status checks are also processor-intensive and time consuming. These effects can be particularly pronounced in messaging clients operating on wireless mobile communication devices, which operate within bandwidth-limited wireless communication networks and may have limited processing and memory resources. In addition, revocation status is updated in CRL-based systems only when a new CRL is distributed.

One alternative scheme for digital certificate revocation status checking involves querying remote systems that maintain digital certificate revocation status information. This type of scheme requires transfer of less information, reduces the complexity of operations that are performed at a messaging client to check the revocation status of a digital certificate, and may also provide more timely digital certificate revocation status information relative to CRL-based schemes. The Online Certification Status Protocol (OCSP) is an illustrative example of such a scheme. However, wireless communication system bandwidth limitations and latency render these known schemes inappropriate for secure messaging clients operating on wireless mobile communication devices.

SUMMARY

According to an aspect of the invention, a system for determining a status of a digital certificate from status data stored in a status-provider system comprises a client system comprising a client module, the client module operable to generate and provide status request data corresponding to a status request for the digital certificate for transmission from the client system, and to receive digital certificate status data for the digital certificate in response to the status request, and a proxy system comprising a proxy module, the proxy module operable to receive the status request data transmitted from the client system and, in response thereto, generate query data for the digital certificate status and provide the query data for transmission from the proxy system to the status provider system, and further operable to receive the status data from the status provider system, generate the digital certificate status data based on the status data received, and provide the digital certificate status data for transmission to the client system.

In accordance with another aspect of the invention, a system for handling digital certificate status check services for a client system comprises a proxy system comprising a proxy module operable to receive from the client system first digital certificate status check service request data for a digital certificate and, in response thereto, to generate second digital certificate status check service request data and to provide the second digital certificate status check service request data for transmission to a digital certificate status check service provider system, and further operable to receive first digital certificate status check service data from the digital certificate status check service provider system, to generate second digital certificate status check service data based on the first digital certificate status check service data received, and to provide the second digital certificate status check service data for transmission to the client system, wherein the second digital certificate status check service data comprises a subset of the first digital certificate status check service data received from the service provider system.

A system for handling digital certificate status check services for a digital certificate, the digital certificate status check services provided by a digital certificate status check service provider system operable to receive query data for a digital certificate status check service request, in another embodiment of the invention, comprises a client system comprising a client module operable to prepare and provide for transmission first digital certificate status check service request data corresponding to a digital certificate status check service for a digital certificate, and to receive first digital certificate status check service data in response to the first digital certificate status check service request data, wherein the first digital certificate status check service request data comprises a subset of the query data for a digital certificate status check service request.

A method for handling digital certificate status check services for. a digital certificate, the digital certificate status check services provided by a digital certificate status check service provider system operable to receive query data for a digital certificate status check service request, according to a further aspect of the invention comprises the steps of receiving a data item, determining whether the data item comprises a digital certificate, generating digital certificate status check service request data comprising a subset of the query data where the data item comprises a digital certificate, providing the digital certificate status check service request data for transmission to a proxy system, and receiving digital certificate status check service data from the proxy system in response to the digital certificate status check service request data.

In a still further embodiment of the invention, a method for handling digital certificate status requests between a client system and a proxy system comprises the steps of receiving at the proxy system digital certificate status request data transmitted from the client system, generating query data for the digital certificate status in response to receiving the digital certificate status request data, transmitting the query data to a status provider system, receiving at the proxy system status data from the status provider system in response to the query data, generating digital certificate status data based on the status data received, and transmitting the digital certificate status data to the client system.

DETAILED DESCRIPTION

A secure message is a message that has been processed by a message sender, or possibly an intermediate system between a message sender and a message receiver, to ensure one or more of data confidentiality, data integrity and user authentication. Common techniques for secure messaging include signing a message with a digital signature and/or encrypting a message. For example, a secure message may be a message that has been signed, encrypted, encrypted and then signed, or signed and then encrypted, according to variants of Secure Multipurpose Internet Mail Extensions (S/MIME).

A messaging client allows a system on which it operates to receive and possibly also send messages. Messaging clients may operate on a computer system, a handheld device, or any other system or device with communications capabilities. Many messaging clients also have additional non-messaging functions.

Figure 1:
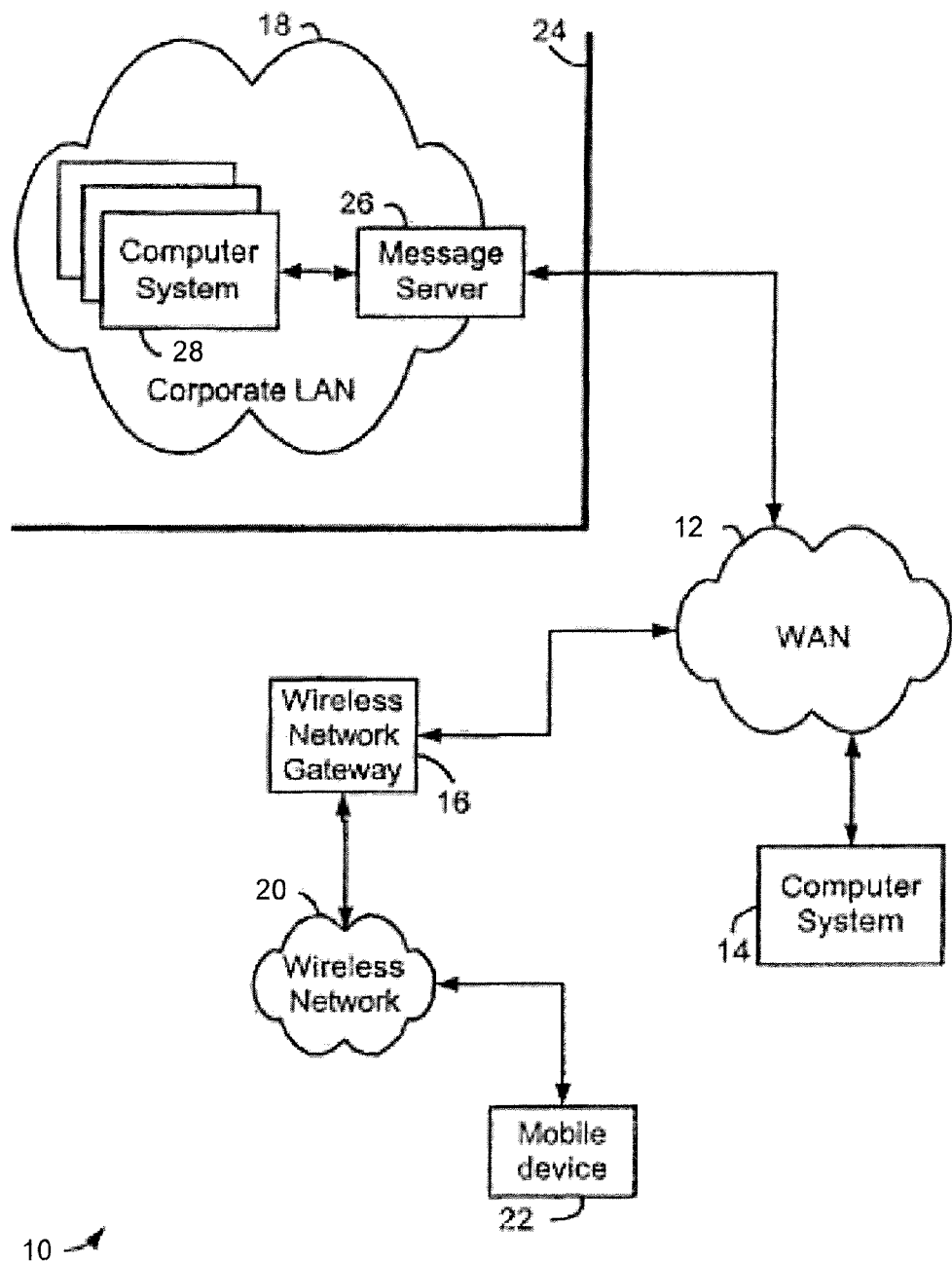
FIG. 1 is a block diagram of an exemplary messaging system.

FIG. 1 is a block diagram of an exemplary messaging system. The system 10 includes a Wide Area Network (WAN) 12, coupled to a computer system 14, a wireless network gateway 16 and a corporate Local Area Network (LAN) 18. The wireless network gateway 16 is also connected to a wireless communication network 20 in which a wireless mobile communication device 22 ("mobile device"), is configured to operate.

An exemplary mobile device 22 is the type disclosed in U.S. Pat. No. 6,278,442, entitled "HAND-HELD ELECTRONIC DEVICE WITH A KEYBOARD OPTIMIZED FOR USE WITH THE THUMBS," the entire disclosure of which is incorporated herein by reference. The computer system 14 is a desktop or laptop PC, which is configured to communicate to the WAN 12. WAN 12 may be a large network, such as the Internet, for example. PCs, such as computer system 14, normally access the Internet through an Internet Service Provider (ISP), Application Service Provider (ASP), or the like.

The corporate LAN 18 is illustratively a network-based messaging client, located behind a security firewall 24. Within the corporate LAN 18, a message server 26, operating on a computer behind the firewall 24, functions as the primary interface for the corporation to exchange messages both within the LAN 18, and with other external messaging clients via the WAN 12. Two exemplary message servers 26 are Microsoft™ Exchange Server and Lotus Domino™. These servers are often used in conjunction with Internet mail routers to route and deliver mail. The message server 26 may also provide additional functionality, such as dynamic database storage for data related to calendars, to-do lists, task lists, e-mail and documentation.

The message server 26 provides messaging capabilities to networked computer systems 28 coupled to the LAN 18. A typical LAN 18 includes multiple computer systems 28, each of which implements a messaging client, such as Microsoft Outlook™, Lotus Notes™, etc. Within the LAN 18, messages are received by the message server 26, distributed to the appropriate mailboxes for user accounts addressed in the received messages, and are then accessed by a user through a messaging client operating on a computer system 28.

The wireless network gateway 16 provides an interface to a Wireless network 20, through which messages are exchanged with the mobile device 22. The mobile device 22 may, for example, comprise a data communication device, a voice communication device, a dual-mode communication device such as a mobile telephone having both data and voice communications functionality, a personal digital assistant (PDA) enabled for wireless communications, or a wireless modem operating in conjunction with a laptop or desktop computer system or some other device. An exemplary mobile device 22 is previously described, and as described further with reference to FIG. 6.

Such functions as addressing of the mobile device 22, encoding or otherwise transforming messages for wireless transmission, and any other required interface functions may be performed by the wireless network gateway 16. The wireless network gateway 16 may be configured to operate with more than one wireless network 20, in which case the wireless network gateway 16 also determines a most likely network for locating a given mobile device user and possibly tracks mobile devices as users roam between countries or networks.

Any computer system with access to the WAN 12 may exchange messages with the mobile device 22 through the wireless network gateway 16. Alternatively, private wireless network gateways such as wireless Virtual Private Network (VPN) routers could also be implemented to provide a private interface to a wireless network. For example, a wireless VPN implemented in the LAN 18 may provide a private interface from the LAN 18 to one or more wireless mobile devices such as 22 through the wireless network 20. Such a private interface to wireless mobile devices via the wireless network gateway 16 and/or the wireless network 20 is effectively extended to entities outside the LAN 18 by providing a message forwarding or redirection system that operates with the message server 26. In this type of system, incoming messages received by the message server 26 and addressed to a mailbox or data store associated with a user of a mobile device such as 22 are sent through the wireless network interface, either a wireless VPN router, the wireless network gateway 16, or another interface, for example, to the wireless network 20 and to the users mobile device 22. Another exemplary redirector system operating on the message server 26 may be of the type disclosed in U.S. Pat. No. 6,219,694, entitled "SYSTEM AND METHOD FOR PUSHING INFORMATION FROM A HOST SYSTEM TO A MOBILE DATA COMMUNICATION DEVICE HAVING A SHARED ELECTRONIC ADDRESS," the entire disclosure of which is incorporated herein by reference.

Another alternate interface to a user's mailbox on a message server 26 is a Wireless Application Protocol (WAP) gateway. Through a WAP gateway, a list of messages in a user's mailbox on the message server 26, and possibly each message or a portion of each message, may be sent to the mobile device 22.

A wireless network normally delivers messages to and from mobile devices via RF transmissions between base stations in the wireless network and the mobile devices. The wireless network 20 may, for example, be a data-centric wireless network, a voice-centric wireless network, or a dual-mode network that can support both voice and data communications over the same infrastructure. Illustrative wireless networks include the Code Division Multiple Access (CDMA) network, the Groupe Special Mobile or the Global System for Mobile Communications (GSM) and the General Packet Radio Service (GPRS), and third-generation (3G) networks such as the Enhanced Data rates for Global Evolution (EDGE) and Universal Mobile Telecommunications Systems (UMTS). GPRS is a data-centric that is a data overlay on top of the existing GSM wireless network.

Some older examples of data-centric network include, but are not limited to: the Mobitex™ Radio Network ("Mobitex"), and the DataTAC™ Radio Network ("DataTAC"). Examples of voice-centric data networks include Personal Communication Systems (PCS) networks like CDMA, GSM, and Time Division Multiple Access (TDMA) systems that have been available for several years.

Perhaps the most common type of messaging currently in use is e-mail. In a standard e-mail system, an e-mail message is sent by an e-mail sender, possibly through a message server and/or a service provider system, and typically routed through the Internet to one or more message receivers. E-mail messages are normally sent in the clear and use traditional Simple Mail Transfer Protocol (SMTP), RFC822 headers and MIME body parts to define the format of the e-mail message.

In recent years, secure messaging techniques have evolved to protect both the content and integrity of messages such as e-mail messages. S/MIME and Pretty Good Privacy™ (PGP™) are two public key secure e-mail messaging protocols that provide for both encryption and signing, which protects the integrity of a message and provides for sender authentication by a message receiver. Secure messages may also be encoded, compressed or otherwise processed in addition to being encrypted and/or signed.

Figure 2:
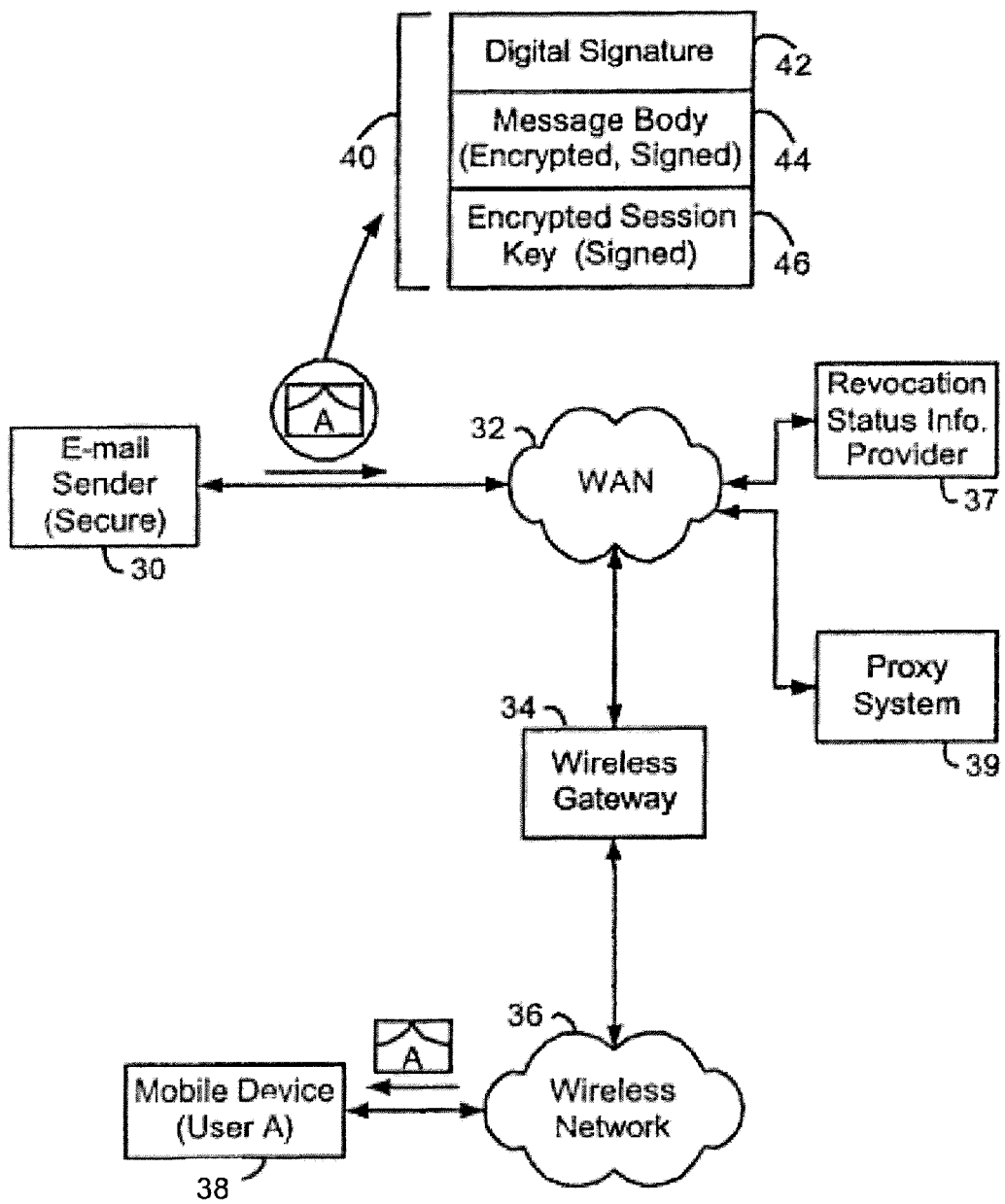
FIG. 2 is a block diagram illustrating a secure e-mail message exchange in a messaging system.

FIG. 2 is a block diagram illustrating a secure e-mail message exchange in a messaging system. The system includes an e-mail sender 30, coupled to a WAN 32 and a wireless gateway 34, which provides an interface between the WAN 32 and a wireless network 36. A mobile device 38 is adapted to operate within the wireless network 36. Also shown in FIG. 2 are a digital certificate revocation status information provider 37 and a proxy system 39, both connected to the WAN 32.

The e-mail sender 30 is a PC, such as the system 14 in FIG. 1, a network-connected computer, such as the computer system 28 or FIG. 1, or another mobile device on which an e-mail message A is composed and sent. The WAN 32, the wireless gateway 34, the wireless network 36, and the mobile device 38 are substantially the same as similarly labelled components in FIG. 1.

According to secure messaging schemes such as S/MIME and PGP, a message is encrypted using a one-time session key chosen by the e-mail sender 30. The session key is used to encrypt the message body and is then itself encrypted using the public key of each addressed message receiver to which the message is to be sent. As shown at 40, a message encrypted in this way includes an encrypted message body 44 and an encrypted session key 46. In this type of message encryption scheme, a message sender such as the e-mail sender 30 must have access to the public key of each entity to which an encrypted message is to be sent.

According to one known digital signature scheme, the secure e-mail sender 30 signs a message by taking a digest of the message and signing the digest using the sender's private key. A digest may, for example, be generated by performing a check-sum, Cyclic Redundancy Check (CRC) or some other preferably non-reversible operation such as a hash on the message. This digest is then signed by the sender using the sender's private key. The private key may be used to perform an encryption or other transformation operation on the digest to generate the digest signature. A digital signature including the digest and the digest signature is then appended to the outgoing message. In addition, a digital certificate of the sender 30, which includes the sender's public key and sender identity information that is bound to the public key with one or more digital signatures, and possibly any chained digital certificates and CRLs associated with the sender's digital certificate and any chained digital certificates, may also be attached to a secure message.

The secure e-mail message 40 sent by the e-mail sender 30 includes the digital signature 42, as well as the encrypted message body 44 and the encrypted session key 46, both of which are signed. The sender's digital certificate, any chained digital certificates, and one or more CRLs may also be included in the message 40. In the S/MIME secure messaging technique, digital certificates, CRLs and digital signatures are normally placed at the beginning of a message, and the message body is included in a file attachment. Messages generated by other secure messaging schemes may place message components in a different order than shown or include additional and/or different components. For example, a secure message 40 may include addressing information, such as "To:" and "From:" e-mail addresses, and other header information.

When the secure e-mail message 40 is sent from the e-mail sender 30, it is routed through the WAN 32 and the wireless gateway 34 to the wireless network 36 and the mobile device 38. The transmission path between the e-mail sender 30 and the mobile device 38 may also include additional or different components than those shown in FIG. 2. For example, the secure e-mail message 40 may be addressed to a mailbox or data store associated with a message server or data server which has been wirelessly enabled to forward or send received messages and data to the mobile device 38. Further intermediate systems may also store and/or route the secure message to the mobile device 38. The exemplary redirection system as previously described and as disclosed in U.S. Pat. No. 6,219,694 is an example of one such system.

In addition, the message may be routed or forwarded to the mobile device 38 through other transport mechanisms than the wireless gateway 34. For example, routing to the wireless network 36 may be accomplished using a wireless VPN router associated with the e-mail sender 30, or, in the case of a message being received at an intermediate computer system or server and then forwarded to the mobile device 38, with the intermediate computer system or server.

Regardless of whether a signed message is sent directly to the mobile device 38 or redirected to the mobile device 38, when a signed message is received, the mobile device 38 may verify the digital signature 42 by generating a digest of the message body 44 and encrypted session key 46, extracting the digest from the digital signature 42, comparing the generated digest with the digest extracted from the digital signature 42, and verifying the digest signature in the digital signature 42. The digest algorithm used by a secure message receiver is the same as the algorithm used by the message sender, and may be specified, for example, in a message header or possibly in the digital signature 42. One commonly used digest algorithm is the so-called Secure Hashing Algorithm 1 (SHA1), although other digest algorithms such as Message-Digest Algorithm 5 (MD5) may also be used.

In order to verify the digest signature 42, a message receiver retrieves the sender's public key and verifies the signature on the digest in the digital signature 42 by performing a reverse transformation on the digest signature. For example, if the message sender generated the digest signature by encrypting the digest using the sender's private key, then a receiver uses the sender's public key to decrypt the digest signature to recover the original digest. If a secure message includes the sender's digital certificate or the sender's digital certificate has already been stored in a data store at the mobile device 38, then the sender's public key is extracted from the received or stored digital certificate. The sender's public key may instead be retrieved from a local store if the public key was extracted from an earlier message from the sender and stored in a key store in the receiver's local store. Alternatively, the sender's digital certificate may be requested from a Public Key Server (PKS). A PKS is a server that is normally associated with a Certificate Authority (CA) from which a digital certificate for an entity, including the entity's public key, is available. A PKS might reside within a corporate LAN such as 18 (FIG. 1), or anywhere on the WAN 32, Internet or other network or system through which message receivers may establish communications with the PKS. A sender's digital certificate may also possibly be loaded onto a mobile device 38 from a PC or other computer system.

A digest algorithm is preferably a non-reversible function that produces a unique output for every unique input. Therefore, if an original message is changed or corrupted, then the digest generated by the receiver will be different from the digest extracted from the digital signature, and signature verification therefore fails. Because digest algorithms are publicly known, however, it is possible that an entity may alter a secure message, generate a new digest of the altered message, and forward the altered message to any addressed message receivers. In this case, the digest generated at the receiver on the basis of the altered message will match the new digest that was added by the entity that altered the message. The digest signature check is intended to prevent verification of a digital signature in such a situation. Even though the generated and new digests will match, since a sender signs the original digest using its own private key, the entity that altered the message cannot generate a new digest signature that can be verified with the sender's public key. Therefore, although the digests in the altered message match, the digital signature will not be verified since the digest signature verification will fail.

These mathematical operations do not prevent anyone from seeing the contents of the secure message, but do ensure the message has not been tampered with since it was signed by the sender, and that the message was signed by the person as indicated on the 'From' field of the message.

It should also be appreciated that other digital signature generation and verification algorithms may instead be used. The digest and reverse transform scheme described above is one example of a digital signature scheme. The present invention is in no way limited thereto.

When the digital signature 42 has been verified, or sometimes even if digital signature verification fails, the encrypted message body 44 is then decrypted before it is displayed or further processed by a receiving messaging client operating on the mobile device 38 in FIG. 2. A receiving messaging client uses its private key to decrypt the encrypted session key 46 and then uses the decrypted session key to decrypt the encrypted message body 44 and thereby recover the original message.

An encrypted message that is addressed to more than one receiver includes an encrypted version of the session key, for each receiver, that is encrypted using the public key of the receiver. Each receiver performs the same digital signature verification operations, but decrypts a different one of the encrypted session keys using its own private key.

Therefore, in a secure messaging system, a sending messaging client must have access to the public key of any receiver to which an encrypted message is to be sent. A receiving messaging client must be able to retrieve the sender's public key, which may be available to a messaging client through various mechanisms, in order to verify a digital signature in a signed message. Although the mobile device 38 is a receiver of the secure message 40, the mobile device 38 may be enabled for two-way communications, and may therefore require public keys for both message sending and message receiving operations.

Public keys are commonly provided in digital certificates. As described above, a digital certificate for any particular entity typically includes the entity's public key and identification information that is bound to the public key with a digital signature. Several types of digital certificates are currently in widespread use, including, for example, X.509 digital certificates, which are typically used in S/MIME. PGP uses digital certificates with a slightly different format. The systems and methods as disclosed herein may be used with any of these types of digital certificates, as well as other types of digital certificates, both currently known types as well as others that are developed in the future.

The digital signature in a digital certificate is generated by the issuer of the digital certificate, and can be checked by a message receiver. A digital certificate sometimes includes an expiry time or validity period from which a messaging client determines if the digital certificate has expired. Verification of the validity of a digital certificate may also involve tracing a certification path through a digital certificate chain, which includes a user's digital certificate as well as possibly other digital certificates to verify that the user's digital certificate is authentic.

A digital certificate may also be checked to ensure that it has not been revoked. As described above, digital certificate revocation status may be checked by consulting a CRL or by requesting digital certificate status information from a digital certificate revocation status information source. In the system of FIG. 2, a user of the mobile device 38 may submit a revocation status request for any digital certificate stored at the mobile device 38 to the revocation status information provider 37. The provider 37 then returns revocation status information for that digital certificate to the mobile device 38.

OCSP is one scheme that provides for determination of digital certificate revocation status without requiring CRLs.

Versions of OCSP have been defined, for example, in RFC 2560 and in the Internet-Draft "Online Digital Certificate Status Protocol, version 2", both available from the Internet Engineering Task Force (IETF). OCSP is one of the most widely used digital certificate revocation status check protocols and is therefore used herein as an illustrative example of such schemes. The systems and methods described herein, however, are also applicable to other types of digital certificate revocation status checking schemes involving retrieval of revocation status information from remote sources.

According to OCSP, a request is submitted to a status information provider, generally referred to as an OCSP responder. Upon receipt of a properly formatted request, an OCSP responder returns a response to the requestor. An OCSP request includes at least an OCSP protocol version number, a service request, and an identification of a target digital certificate to which the request is related.

The version number identifies the version of OCSP with which the request complies. The service request specifies the type of service being requested. For OCSP version 2, Online Revocation Status (ORS), Delegated Path Validation (DPV) and Delegated Path Discovery (DPD) services have been defined. Through the ORS service, a messaging client obtains revocation status information for digital certificates. The DPV and DPD services effectively delegate digital certificate validation path-related processing to a remote system.

Normally, a target digital certificate is identified in an OCSP request using a hash of the distinguished name (DN) of the issuer of the digital certificate, as well as the serial number of the digital certificate. However, since multiple digital certificate issuers may use the same DN, further identification information, in the form of a hash of the issuer's public key, is also included in the request. Therefore, target digital certificate information in an OCSP request includes a hash algorithm identifier, a hash of the DN of the digital certificate issuer generated using the hash algorithm, a hash of the issuer's public key, also generated using the hash algorithm, and the serial number of the target digital certificate.

The request may or may not be signed by a requestor. Further optional information may also be included in a request and processed by an OCSP responder.

When a messaging client is operating on a mobile device 22, OCSP may be desirable in that it reduces the processing and memory resources necessary to check revocation status of a digital certificate relative to CRL-based revocation status checking. However, OCSP requests can be relatively long and thereby consume the typically limited wireless communication resources and power available on a mobile device. The proxy system 39, in conjunction with an appropriately enabled mobile device 38, is used to optimize OCSP and similar protocols involving remote systems for mobile devices, as described in further detail below.

Figure 3:
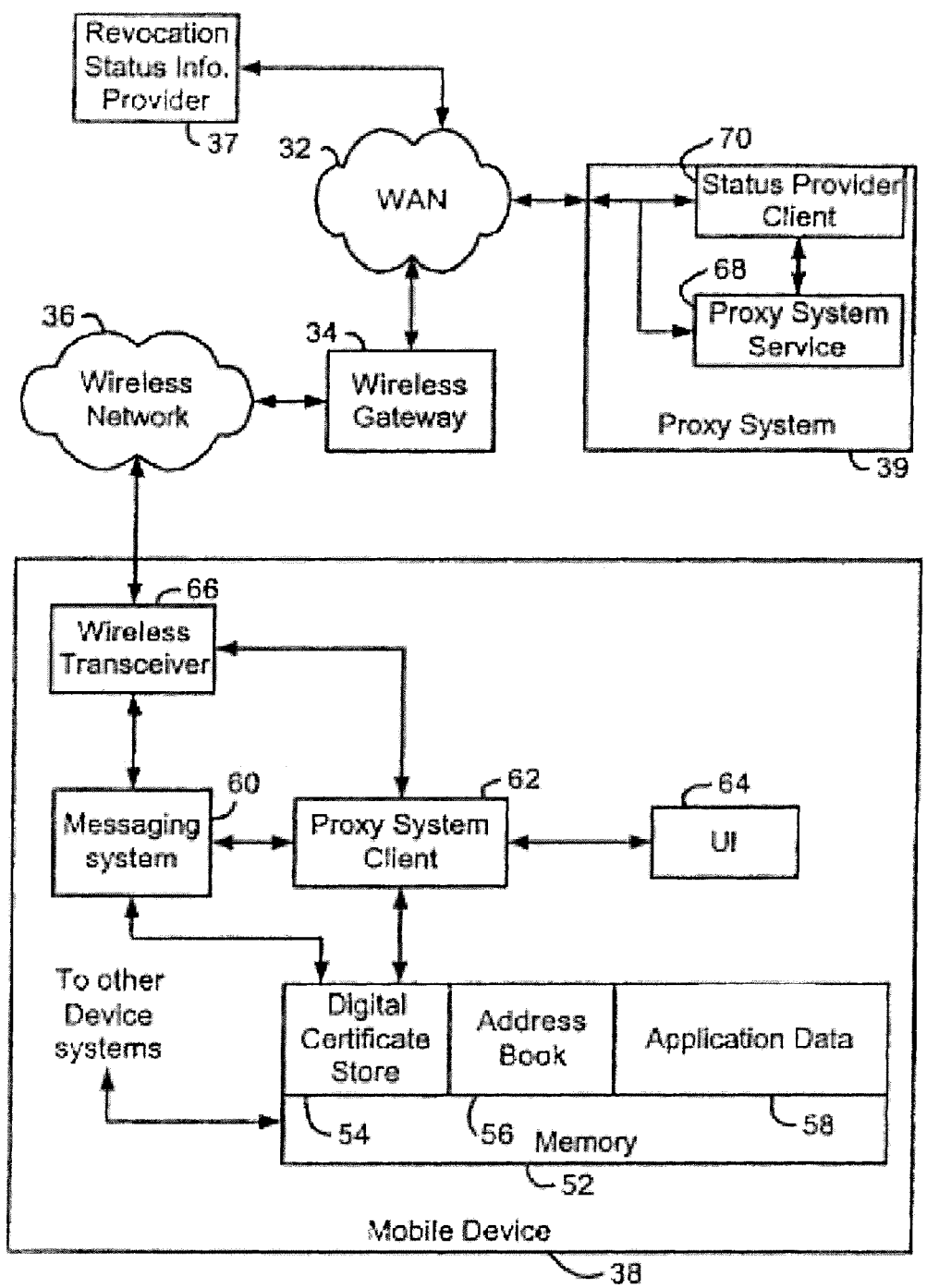
FIG. 3 is a block diagram of a system implementing a digital certificate revocation status check system.

FIG. 3 is a block diagram of a system implementing a digital certificate revocation status check system. The mobile device 38 includes a memory 52, a messaging system 60, a proxy system client module 62, a user interface (UI) 64, and a wireless transceiver 66. The memory 52 preferably includes a storage area for a digital certificate store 54, as well as possibly other data stores such as an address book 56 in which messaging contact information is stored, and an application data storage area 58 which stores data associated with software applications installed on the mobile device 38. Data stores 56 and 58 are illustrative examples of stores that may be implemented in a memory 52 on mobile device 38. The memory 52 may also be used by other device systems in addition to those shown in FIG. 3 to store other types of data.

The memory 52 is illustratively a writeable store such as a RAM into which other device components may write data. The digital certificate store 54 is a storage area dedicated to storage of digital certificates on the mobile device 38. Digital certificates may be stored in the digital certificate store 54 in the format in which they are received, or may alternatively be parsed or otherwise translated into a storage format before being written to the store 54.

The messaging system 60 is connected to the wireless transceiver 66 and is thus enabled for communications via the wireless network 36. The messaging system 60, in most implementations, is a messaging client embodied in a software application.

The proxy system client module 62, which is also preferably implemented as a software application or component, is coupled to the messaging system 60, the wireless transceiver 66, the digital certificate store 54, and the UI 64. Revocation status for any of the digital certificates stored in the digital certificate store 54, as well as digital. certificates received by the messaging system 60 but not yet stored in the digital certificate store 54, may be checked using the proxy system client module 62, as described in detail below.

The UI 64 may include such UI components as a keyboard or keypad, a display, or other components which accept inputs from or provide outputs to a user of the mobile device 38. Although shown as a single block in FIG. 3, a mobile device typically includes more than one UI, and the UI 64 therefore represents one or more user interfaces.

The wireless network 36, wireless gateway 34, WAN 32 and revocation status information provider 37 are the same as similarly-labelled components in FIG. 2.

The proxy system 39 includes a proxy system service module 68 and a status provider client module 70. The proxy system 39 illustratively comprises one or more computers connected to the WAN 32 and operable to receive an encryption item status request from mobile device 38, or some other client system, and perform the status request and attendant processing steps on behalf of the mobile device 38. In one embodiment, the proxy system 39 is an intermediate computer that performs the status request on behalf of the mobile device 38. The intermediate computer may be further operable to provide the address of the mobile device with the status request. In another embodiment, the proxy system 39 comprises a proxy server that is also operable to perform proxy server functions, such as providing security, administrative control, and caching, in addition to performing the status request on behalf of the mobile device 38.

The proxy system service module 68 is configured to exchange information with the proxy system client module 62, and the status provider client module 70 is adapted to exchange information with the revocation status provider 37. Each of these components, the status provider client module 70 and the proxy system service module 68 is preferably a software application or module operating at the proxy system 39. These software applications may be embodied in a single computer program, or may alternatively be separate programs executed independently.

In operation, the messaging system 60 on the mobile device 38 receives and possibly sends secure messages via the wireless network 36 as described above. When a signature on a received secure message is to be verified or a message is to be sent with an encrypted session key, the messaging system 60 may retrieve a public key for an entity (i.e., a sender of a received message or a recipient of a message to be sent) from a digital certificate. Before the public key is used, however, the messaging system 60 or a user thereof may wish to check that the digital certificate containing the public key is valid and has not been revoked.

Digital certificate verification operations may be performed automatically, when a digital certificate is received with a secure message, or at predetermined or user-configurable intervals, for example, or when invoked by a user through a UI 64.

Different types of digital certificate checking operations may also be dependent upon different controls. For example, the validity and revocation status of a digital certificate may be checked automatically when the digital certificate is first loaded onto the mobile device 38. If the digital certificate is valid and not revoked, then it may be assumed to be valid until an expiry time or during a validity period specified in the digital certificate, whereas its revocation status may thereafter be checked once every week to ensure that it is not revoked before it expires.

As described above, digital certificate status information requests to a remote information provider such as 37 may be relatively long and are therefore not optimal for implementation in a mobile device 38 or other bandwidth-limited communication systems. The proxy system client and service modules 62 and 68 are adapted to reduce the amount of information that is sent from the mobile device 38 to request status information for a digital certificate.

When a user of the mobile device 38 wishes to check the revocation status of a digital certificate, the proxy system client module 62, or possibly a software application which operates in conjunction with the proxy system client module 62, is invoked by entering an appropriate command on a UI 64, such as a keyboard, for example. The user also specifies the particular digital certificate to be checked, for instance using the serial number or subject name of the digital certificate. Alternatively, the proxy system client module 62 accesses the digital certificate store 54 to display to the user a list of currently stored digital certificates, from which the user selects one or more digital certificates to be checked.

The proxy system client module 62 then preferably either extracts from the selected digital certificate(s) or-obtains from the user through a UI 64 any information required by the proxy system service module 68 for a digital certificate revocation status check. Since the proxy system 39 provides an interface between the mobile device 38 and the status information provider 37, requests and responses between the proxy system client module 62 and proxy system service module 68 need not conform to the protocol used between the status provider client module 70 and the status information provider 37. Therefore, although the status provider 37 and status provider client module 70 may support OCSP or a similar protocol, the proxy system service module 68 and proxy system client module 62 preferably support a more wireless-friendly protocol involving less data exchange, such as smaller requests.

The particular information extracted or obtained by the proxy system client module 62 is dependent upon the communication protocol implemented between the proxy system client module 62 and the proxy system service module 68. The proxy system client module 62 preferably extracts a digital certificate subject name, serial number, issuer name, and other digital certificate information from a digital certificate stored in the digital certificate store 54. If digital certificates are first parsed so that parsed data is stored in the digital certificate store 54, then such information is extracted from the parsed data in the digital certificate store 54 by the proxy system client module 62. If further information is required, a user is prompted to enter the information.

When all required information has been extracted or otherwise obtained by the proxy system client module 62, a request is formatted and sent to the proxy system service module 68. The content of this request is also dependent upon the communication protocol used between the proxy system service module 68 and client module 62. If more than one type of service is supported, then the request may specify which type of service is requested. In some implementations, only a single service may be supported, such that no service type need be specified.

Information received by the proxy system service module 68 is preferably passed to the status provider client module 70. This information is then used by the status provider client module 70 to format a request for the status information provider 37. If the revocation status information provider 37 and status provider client module 70 support OCSP, for example, information provided by the proxy system service module 68, as well as any further required information, are formatted into an OCSP request. In some cases, the information provided by the proxy system service module 68 includes all required information, whereas in other cases, further information is extracted from other sources. For example, where the proxy system 39 is configured to store a mapping table or like element which maintains a correspondence between digital certificate issuers and serial numbers and/or subject names, then the status provider client module 70 may format a status request for the correct revocation status information provider 37 based on only a serial number or subject name received by the proxy system service module 68 from the proxy system client module 62.

In FIG. 3, it is assumed that the revocation status information provider 37 supports an ORS or like service. Upon receiving a request, the revocation status information provider 37, which is an OCSP responder when the provider 37 and the client module 70 support OCSP, checks the request to ensure that it is formatted properly, that the requested service is a service that it is configured to provide, and that the request includes all of the information required for the requested service. If these conditions are not met, then the provider 37 returns an error message to the client module 70. The client module 70 then performs error processing to provide any missing required information and possibly to request missing information from the mobile device 38 through the proxy system service module 68, or returns an error message to the proxy system service module 68, which then formats and sends an error message to the proxy system client module 62 as a response to its initial service request. Other conditions, such as when a provider 37 receives an unsigned request but is configured to expect signed requests, or when a provider service is unable to respond, may also result in an error message being returned to the provider client module 70.

If the request meets required conditions, then a definitive response is returned to the provider client module 70. A definitive response may include one of a plurality of status indications, such as a "valid" or like indication when a target digital certificate has not been revoked, a "revoked" indication when the target digital certificate has been revoked, or an "unknown" indication if the status provider 37 has no record or knowledge of the target digital certificate.

Furthermore, the proxy system client module 62 may also be operable to classify the digital certificate as "pending" when awaiting the status of the digital certificate after sending a request. The status of the digital certificate is then changed from pending to one of valid, revoked, or unknown after the proxy system client module 62 receives the corresponding status indication from the proxy system 39. The proxy system client module 62 may also be configured to prompt a user via an I/O device on the mobile device 38 to confirm an action to be executed on a data item if the data item includes a digital signature with a status of pending, revoked, or unknown.

A response returned to the status provider client module 70 by the status information provider 37 is passed to the proxy system service module 68, which prepares and sends a response to the proxy system client module 62. When the response from the provider 37 is signed and the proxy system client module 62 or another component on the mobile device 38 is configured to verify status response signatures, then the entire response from the status provider 37, or possibly the signed portions thereof, are preferably forwarded to the proxy system client module 62 substantially unchanged. However, if the proxy system service module 68 or the status provider client module 70 checks status response signatures on behalf of the mobile device 38, then only certain parts of the response, for example, the status indication and the digital certificate serial number or subject name, are preferably extracted by the proxy system service module 68 and formatted into a response that is then sent to the proxy system client module 62. The response from the proxy system service module 68 is then processed by the proxy system client module 62 to determine whether the digital certificate has been revoked.

The presence of a proxy system client module 62 preferably does not preclude digital certificate validity and revocation status checks according to known techniques. Thus, digital certificate status checks involving remote systems such as the status information provider 37 are complementary to other status check operations for which the mobile device 38 are enabled.

While the embodiment of FIG. 3 depicts the wireless gateway 34, the proxy system 39, and the revocation status provider 37 as separate systems communication over the WAN 32, these systems may be combined. For example, in an alternative embodiment, a software application comprising the proxy system service module 68 and the status provider client module 70 is stored and executed on the wireless gateway 34.

In yet another embodiment, the software application comprising the proxy system service module 68 and the status provider client module 70 is stored and executed on the revocation status provider 37. In still another embodiment, the software application comprising the proxy system service module 68 and the status provider client module 70 is stored and executed on the message server 26 (FIG. 1). Of course, other configurations and communication paths for computer systems distributed throughout one or more networks that enable the functionality of the client/proxy digital certificate status system as disclosed herein may also be used.

In another alternative embodiment, the wireless gateway 34 is operable to determine if a data item, such as an S/MIME message to be transmitted to the mobile device 38, is signed with a digital signature or includes a digital certificate. If so, then the wireless gateway 34 pre-emptively queries the revocation status provider 37 to obtain the digital certificate status for the signer of the S/MIME message.

The digital certificate status is preferably obtained before the S/MIME message is transmitted to the mobile device 38, in which case the S/MIME message is stored at the wireless gateway 34. The wireless gateway 34 may be further operable to discard the S/MIME message if the digital certificate is not valid or expired, or alternatively may transmit the S/MIME message to the mobile device 38 with a notification that the digital certificate status is not valid or is expired.

Figure 4A:
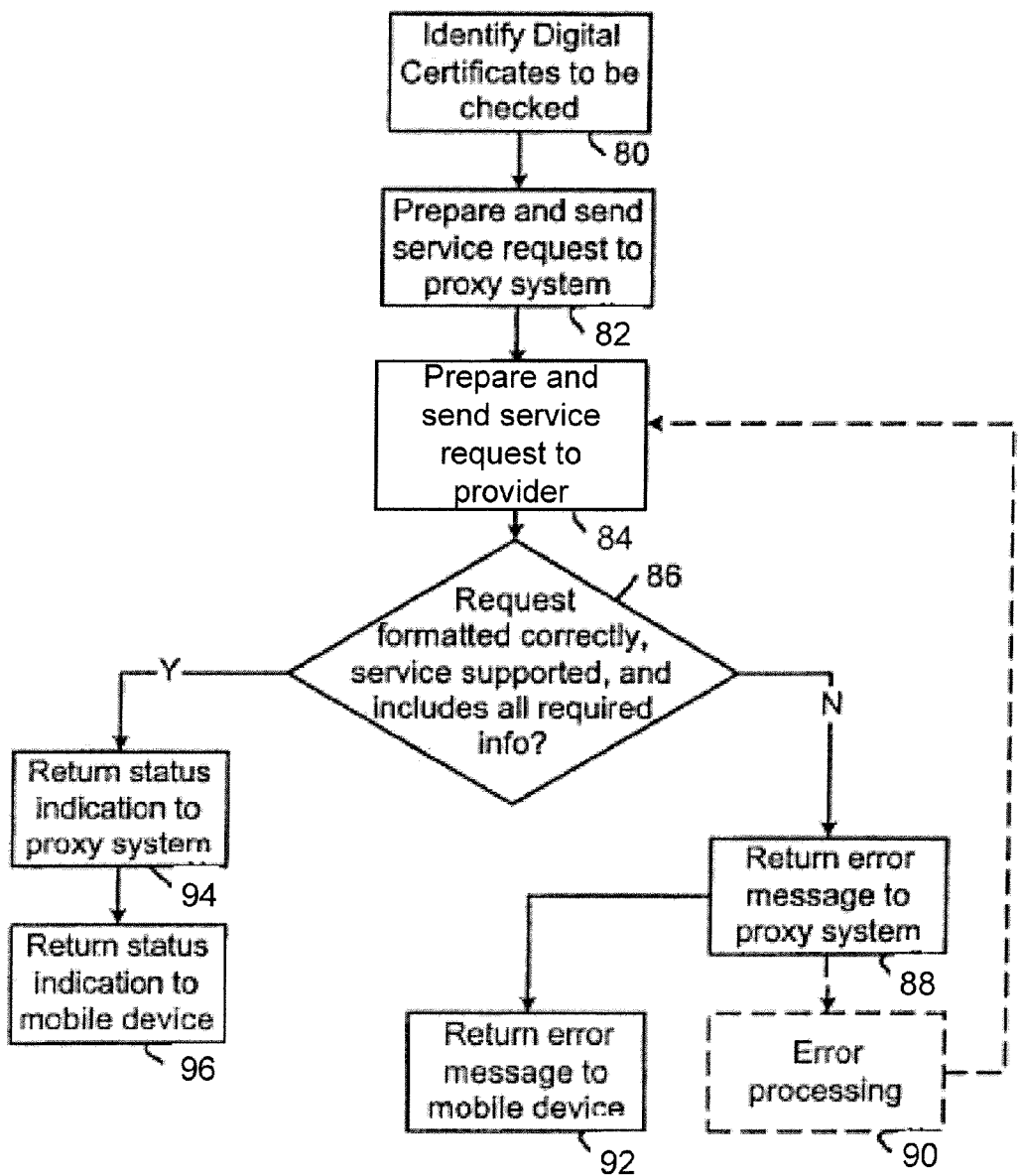
FIG. 4A is a flow diagram illustrating a method of checking digital certificate revocation status.

FIG. 4A provides a flow diagram illustrating a method of checking digital certificate revocation status. At step 80, any digital certificates for which a status check is to be performed are identified. As described above, this step could be performed automatically or the digital certificates could be selected by a user. A service request is then prepared and sent to the proxy system at step 82. At step 84, the proxy system prepares and sends a service request to a status information provider such as an OCSP responder. The status information provider then checks the request to ensure that it is formatted properly, that the requested service, digital certificate revocation status in this example, is supported by the provider, and that all required information is included in the request. These checks are performed at step 86.

If the request does not satisfy these conditions, then an error message is returned to the proxy system at step 88. An error message is also returned to the mobile device at step 92. Alternatively, error processing may be executed at step 90, to obtain further information when the request does not include all required information, for example, after which a new service request may be prepared and sent to the provider at step 84.

When the request satisfies the conditions in step 86, the status information provider returns a status indication to the proxy system at step 94, in response to the service request from the proxy system. Then, at step 96, the proxy system returns the entire response from the status information provider, or at least parts thereof, to the mobile device, as a response to the initial service request from the mobile device.

Although the system and method described above relate to the illustrative example of digital certificate revocation status checking, digital certificate validity checks, according to the DPV and DPD services of OCSP or other protocols, for example, may similarly be optimized for mobile devices and other types of processing-, memory- or communication resource-constrained systems through. a proxy system client module and service. A proxy system 39 may also be enabled to provide its proxy service to multiple mobile devices.

Figure 4B:
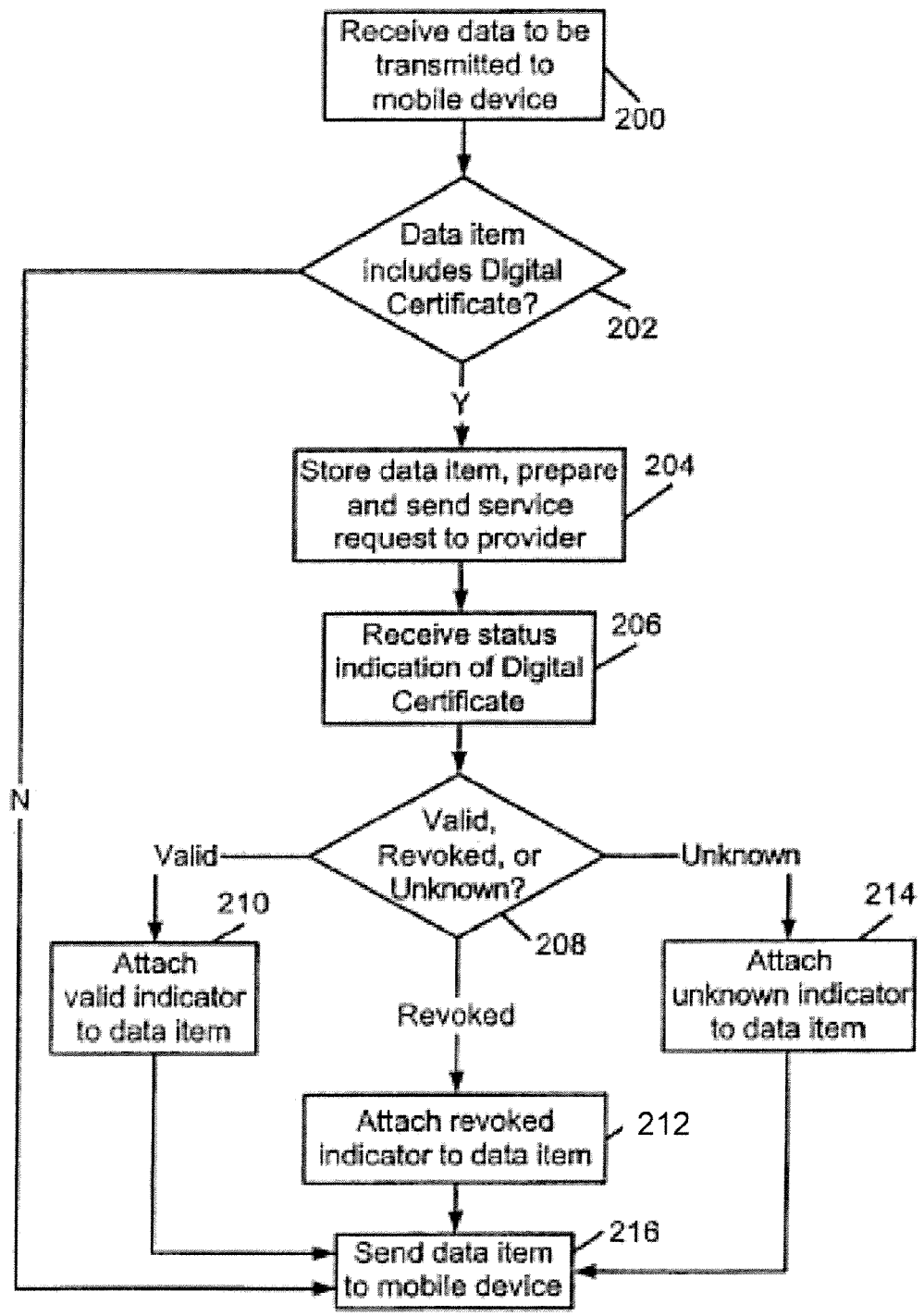
FIG. 4B is a flow diagram illustrating another method of checking digital certificate revocation status.

FIG. 4B provides a flow diagram illustrating another method of checking digital certificate revocation status. In this method, the wireless gateway 34 (FIG. 3) executes a proxy program as previously described, and is further operable to determine if a data item, such as an S/MIME message, to be transmitted to the mobile device 38 includes a digital certificate. If so, the wireless gateway 34 preemptively queries the revocation status information provider 37.

At step 200, the wireless gateway 34 receives a data item to be transmitted to the mobile device 38. In step 202, the wireless gateway determines if the data item includes a digital certificate. If the data item does not include a digital certificate, then the data item is sent to the mobile device 38, as shown in step 216.

However, if the data item includes a digital certificate, then the wireless gateway 34 stores the data item and prepares a service request that is sent to a status provider, as shown in step 204.

The status information is received in step 206, and in step 208 the 20 wireless gateway 34 determines if the digital certificate status is valid, revoked, or unknown. If the digital certificate is valid, then the wireless gateway 34 attaches a valid indicator to the data item, and the data item is then redirected to the mobile device 38, as shown in steps 210 and 216. If the digital certificate is revoked, then the wireless gateway 34 attaches a revoked indicator to the data item, and the data item is then sent to the mobile device 38, as shown in steps 212 and 216. If the digital certificate is unknown, then the wireless gateway 34 attaches an unknown indicator to the data item, and the data item is sent to the mobile device 38, at steps 214 and 216.

Thus, upon receipt of a data item that includes a digital certificate, the mobile device determines the status of the digital certificate immediately by consulting the valid, revoked or unknown indicator that is attached to the data item.

In an alternative embodiment, the wireless gateway 34 preemptively queries the revocation status information provider, but forwards the received data item to the mobile device with an indicator, a "pending" indicator for example, which indicates that digital certificate status has been queried. A further indication of certificate status is then sent to the mobile device when a status indication is received from the status information provider.

In another embodiment, the message server 26 (FIG. 1) also comprises a redirection system as described above. The redirection system executes a proxy program and is further operable to determine if a data item to be transmitted to the mobile device 38 includes a digital certificate. If so, the redirection system preemptively queries the revocation status provider 37 to obtain the digital certificate status, and performs similar processing steps as described with respect to the wireless gateway 34 and FIG. 4B.

Figure 5:
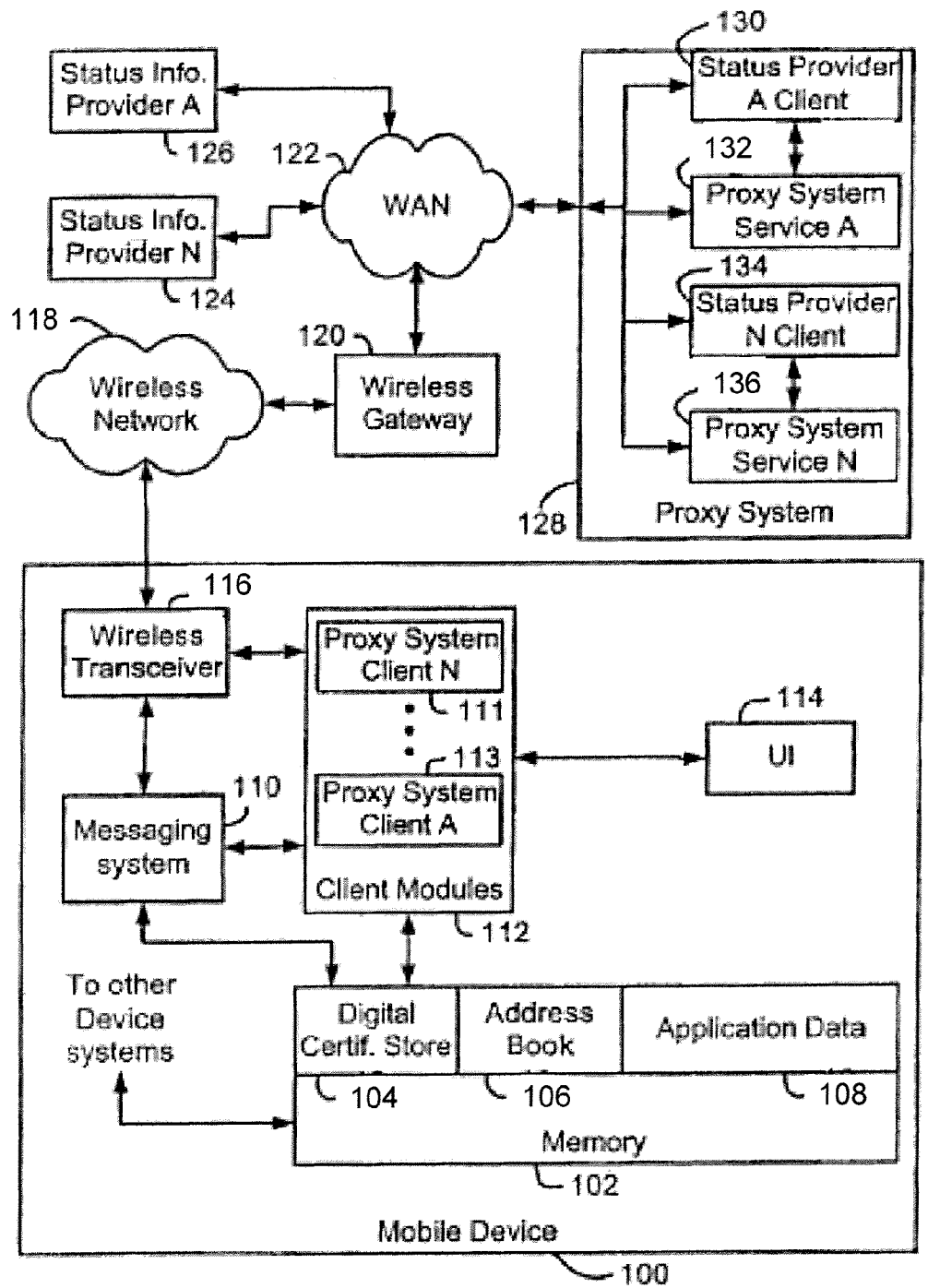
FIG. 5 is a block diagram of a system implementing a digital certificate revocation status check system having multiple proxy system client modules.

In a further embodiment, a mobile device and a proxy system include multiple client and service modules. FIG. 5 is a block diagram of a system implementing a digital certificate revocation status check system having multiple proxy system client modules. In FIG. 5, the memory 102, the data stores 104, 106, 108, the messaging system 110, the UI 114, the wireless transceiver 116, the wireless network 118, the wireless gateway 120, and the WAN 122 are substantially the same as similarly labelled components in FIG. 3.

The mobile device 100 includes client modules 112, including proxy system client module A 111 and proxy system client module N 113, and possibly other proxy system client modules. The proxy system 128 includes corresponding proxy system service modules A and N, 132 and 136. The proxy system 128 also includes status provider client modules A and N, 130 and 134, which are configured for communications with the status information provider A 124 and the status information provider N 126, respectively.

The system shown in FIG. 5 operates substantially as described above. When the status of one or more digital certificates, such as revocation status, for example, is to be checked, each proxy system client module 111 and 113 preferably extracts or otherwise obtains information required in a service request to its respective proxy system service module 132 and 136. The status provider client modules 130 and 134 then use the information from the service request from the mobile device 38, and possibly information available at the proxy system 128, to prepare a service request to status information providers 124 and 126. Responses returned by the status information providers 124 and 126, or at least portions thereof, are then reformatted if necessary and returned to the proxy system client modules 111 and 113 at the mobile device 100.

Each proxy system client module 111 and 113 may be adapted to collect request information and process response information for a different remote digital certificate status check protocol. However, the information collected by both proxy system client modules 111 and 113 may be combined into a single service request to the proxy system 128. Each proxy system service module 132 and 136 then extracts information from the service request required for a service request to its associated status information provider 124 and 126. Responses returned to the status provider client modules 130 and 134 by the status provider systems 124 and 26 is returned to the proxy system client modules 111 and 113 either separately or in a single response. For example, when one or both of the status information providers 124 and 126 signs its responses, and the proxy system client modules 132 and 136 are configured to verify response signatures, then separate responses are preferably returned to the proxy system client modules 111 and 113 according to their respective protocols. If responses are not signed, however, the responses may be combined into a single response.

A multiple-client module system as shown in FIG. 5 is particularly useful when a user wishes to check the validity and/or revocation status of an entire digital certificate chain which includes digital certificates for which status information is available from different status information providers. In known systems, separate requests for each digital certificate in the chain must be sent to the status information providers. In the system of FIG. 5, however, only a single request need be sent from the mobile device 100 to obtain status information from a number of status information providers. Furthermore, common information that is required by all proxy system client modules and service modules need be included only once in an initial service request sent to the proxy system 128, thereby reducing redundancy in the initial service request.

Figure 6:
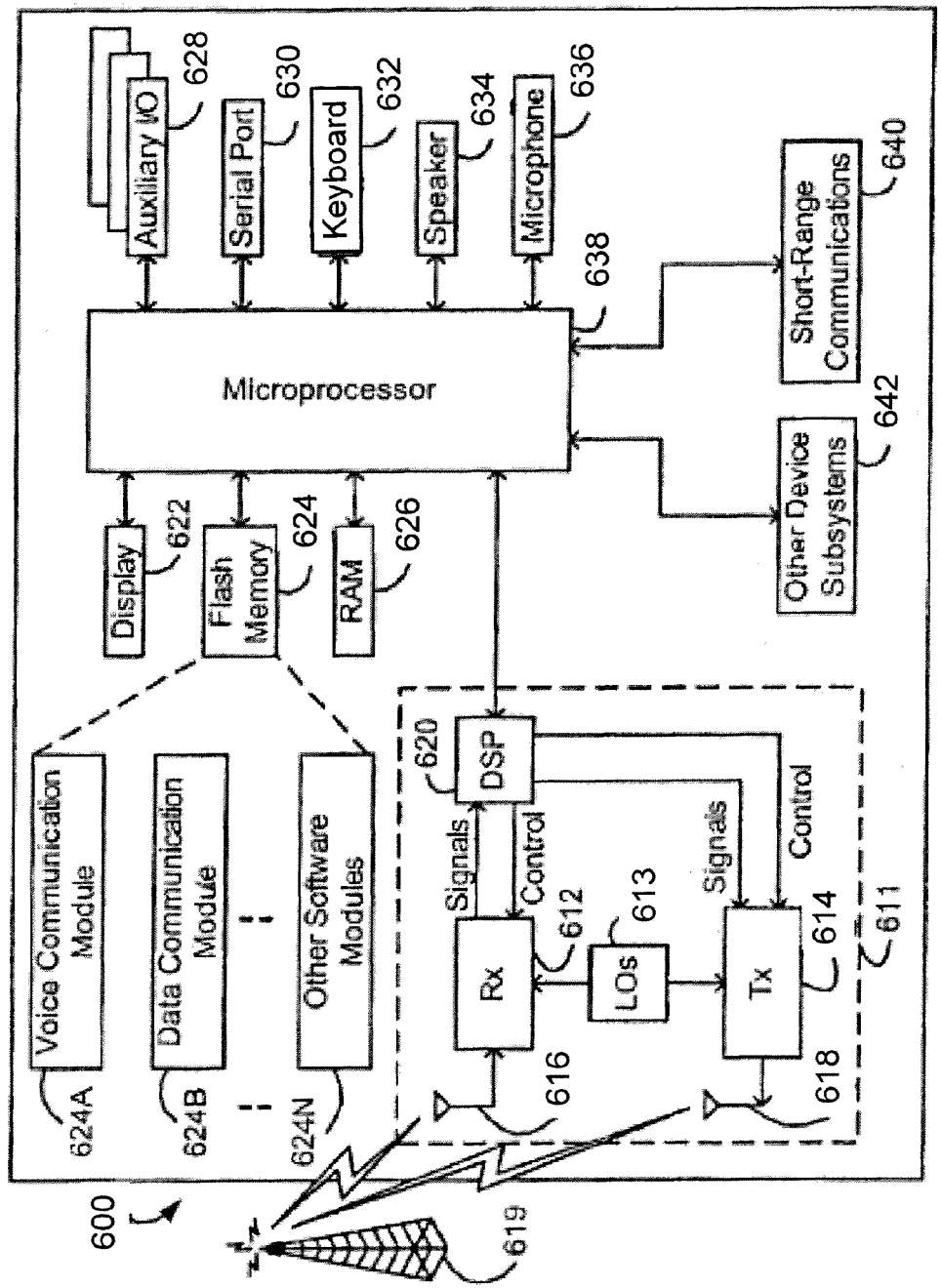
FIG. 6 is a block diagram of a wireless mobile communication device.

FIG. 6 is a block diagram of a wireless mobile communication device. The mobile device 600 is preferably a two-way communication device having at least voice and data communication capabilities. The mobile device 600 preferably has the capability to communicate with other computer systems on the Internet. Depending on the functionality provided by the mobile device, the mobile device may be referred to as a data messaging device, a two-way pager, a mobile telephone with data messaging capabilities, a wireless Internet appliance, or a data communication device (with or without telephony capabilities). As mentioned above, such devices are referred to generally herein simply as mobile devices.

The mobile device 600 includes a transceiver 611, a microprocessor 638, a display 622, a Flash memory 624, a random access memory (RAM) 626, auxiliary input/output (I/O) devices 628, a serial port 630, a keyboard 632, a speaker 634, a microphone 636, a short-range wireless communications sub-system 640, and other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the Flash memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

The mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or they may be integrated into a single wireless network. References to the network 619 should therefore be interpreted as encompassing both a single voice and data network and separate networks.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 6, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., will be dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the mobile device 600 may also vary. For example, in the Mobitex and DataTAC data networks, mobile devices are registered on the network using a unique identification number associated with each device. In GPRS data networks, however, network access is associated with a subscriber or user of the mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for such operations as signal amplification, frequency down conversion, filtering, channel selection, and analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 6 for both voice and data communications, it is possible that the mobile device 600 may include two distinct transceivers, a first transceiver for transmitting and receiving voice signals, and a second transceiver for transmitting and receiving data signals. Multiple transceiver may also be provided in a mobile device adapted to operate within more than one communication network or multiple frequency bands.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600; Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B are stored in the Flash memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619. On the mobile device 600, a secure messaging software application, incorporating software modules corresponding to the messaging system 60 and the proxy system client module 62 or client modules 113 and 111, for example, may operate in conjunction with the data communication module 624B in order to implement the techniques described above.

The microprocessor 638 also interacts with other device subsystems, such as the display 622, the Flash memory 624, the RAM 626, the auxiliary input/output (I/O) subsystems 628, the serial port 630, the keyboard 632, the speaker 634, the microphone 636, the short-range communications subsystem 640, and any of the other device subsystems generally designated as 642. For example, the modules 624A-N are executed by the microprocessor 638 and may provide a high-level interface between a user and the mobile device 600. This interface typically includes a graphical component provided through the display 622, and an input/output component provided through the auxiliary VO 628, the keyboard 632, the speaker 634, or the microphone 636. Such interfaces are designated generally as UI 64 in FIGS. 3 and 5.

Some of the subsystems- shown in FIG. 6 perform communication-related functions, whereas other subsystems may provide "resident" or on-device functions. Notably, some subsystems, such as the keyboard 632 and the display 622 are used for both communication-related functions, such as entering a text message for transmission over a data communication network, and device-resident functions such as a calculator or task list or other PDA type functions.

Operating system software used by the microprocessor 638 is preferably stored in a non-volatile store such as Flash memory 624. In addition to the operating system and communication modules 624A-N, the Flash memory 624 may also include a file system for storing data. A storage area is also preferably provided in the Flash memory 624 to store digital certificates, address book entries and possibly other information required for messaging, shown as data stores 54, 56 and 58 in FIGS. 3 and 5. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in the Flash memory 624.

An exemplary application module 624N that may be loaded onto the mobile device 600 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The Flash memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

Although shown as a Flash memory 624, those skilled in the art will appreciate that other types of non-volatile store, such as a battery backed-up RAM, for example, could be used in addition to or instead of the Flash memory 624.

The mobile device 600 may also be manually synchronized with a computer system by placing the mobile device 600 in an interface cradle, which couples the serial port 630 of the mobile device 600 to the serial port of the computer system. The serial port 630 may also be used to enable a user to set preferences through an external device or software application, to download other application modules 624N for installation, and possibly to load digital certificates onto a mobile device. This wired download path may further be used to load an encryption key onto the device, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A digital certificate received by the transceiver 611, in response to a request to a PKS or attached to a secure message, for example, may be added to a digital certificate store in the Flash memory 624 if it has not already been stored. Validity and/or revocation status of such a digital certificate may also be checked as described above. A user of mobile device 600 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. In addition, the secure messaging techniques described above might not necessarily be applied to voice communications. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

The short-range communications subsystem 640 may include an infrared device and associated circuits and components, or a short-range wireless communication module such as a Bluetooth™ module or an 802.11 module to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless LANs, respectively.

The above description relates to preferred embodiments by way of example only. Other embodiments may be realized. For example, although digital certificate status checks are described primarily in the context of a wireless mobile communication device, the systems and methods disclosed herein are also applicable to messaging clients operating on other platforms, including those operating on desktop and laptop computer systems, networked computer workstations and other types of messaging clients for which digital certificate checks involving remote systems may be desired.

While the above description also relates primarily to OCSP, other protocols may similarly be optimized through an intermediate proxy system which operates in conjunction with both remote systems and proxy system client modules. Such other protocols are not limited to digital certificate status check protocols. A proxy system and proxy system client modules may be configured to provide other services than digital certificate status check services.

Figure 7:
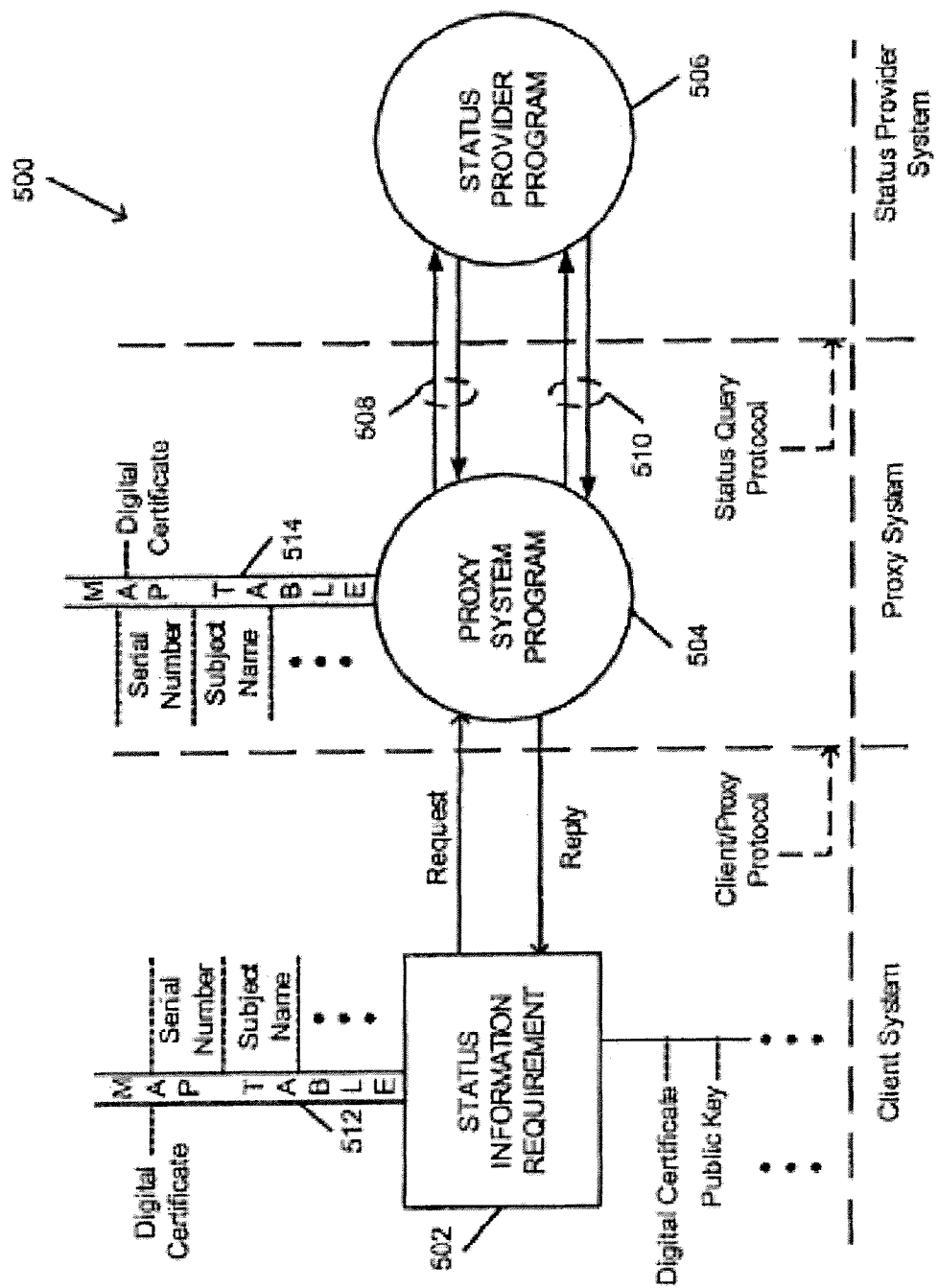
FIG. 7 is a functional block diagram illustrating the processing of a digital certificate status request.

FIG. 7 provides a functional block diagram 500 illustrating the processing of a digital certificate status request. Although the processing of a digital certificate status request is shown in FIG. 7, other types of status request may also be handled as depicted in FIG. 7. A client system has a status information requirement 502 to be served by an external system, such as a proxy system running a proxy system program 504 embodying one or more proxy system service modules and status provider client modules.

The digital certificate status request is sent to the proxy system program 504 running on a proxy system. The digital certificate status request sent to the proxy system program 504 conforms to a client/proxy protocol. The proxy system program 504 is operable to receive the digital certificate status request and perform the status request and attendant processing steps on behalf of the client system, as described with reference to the proxy system service module 68 and the status provider client module 70. The client/proxy protocol may conform to a known communication protocol, or may instead be a proprietary protocol.

The proxy system program 504 then prepares the digital certificate status request, including information in the request from the client system and possibly information available at the proxy system, in the map table 514, for example, to be sent according to a status query protocol to a status provider system running a status provider program 506. The status query protocol may conform to a known status protocol, such as OCSP, or may instead be a proprietary protocol. In one embodiment, the client/proxy protocol is a first protocol, such as a proprietary protocol, and the status query protocol is a second protocol, such as OCSP.

The status provider program 506 then processes the query and the status provider system provides digital certificate status data to the proxy system program 504. The digital certificate status data illustratively comprises a digital certificate status indicator. If the digital certificate comprises a chain of digital certificates, then a corresponding number of digital certificate status indicators are provided to the proxy system program 504. Furthermore, the status provider program 506 may require additional information from the proxy system program 504, and thus, multiple communications between the proxy system program 504 and the status provider program 506 may occur. Accordingly, multiple communications 508 and 510 are represented between the proxy system program 504 and the status provider program 506.

Upon completion of the digital certificate status request, the proxy system program 504 prepares the digital certificate status data for transmission back to the client system. In one embodiment, the proxy system program 504 selects the entire set of status reply data received from the status provider program 506 to be transmitted to the client system. In another embodiment, the proxy system program selects only a single status indicator, such as valid, invalid, unknown, or revoked to be transmitted to the client system. For example, if one digital certificate in a chain of digital certificates is found to be invalid by the status provider program 506, then the proxy system program 504 may select only an invalid status indicator to be transmitted to the client system. Alternatively, the proxy system program 504 may select an invalid status indicator to be transmitted to the client system and also data to specify which digital certificate in a digital certificate chain is invalid. Other data combinations may also be derived to be sent back to the client system.

The client system and the proxy system store corresponding mapping tables 512 and 514 or like elements which maintain a correspondence between digital certificate issuers and serial numbers and/or subject names. The client system may then provide only a unique indicator for a corresponding digital certificate, such as a serial number or subject name. The proxy system program 504 may then format a digital certificate status request according to the status query protocol for the status provider system running the status provider program 506 based on only a serial number or subject name received from the client system. Similarly, a unique identifier returned to the client system by the proxy system is resolved if necessary by the client system using the mapping table 512. Thus, if the client system comprises a mobile device operable to communicate with the proxy system over a wireless network, the mapping tables 512 and 514 conserve the relatively limited bandwidth of the RF network.

Figure 8:
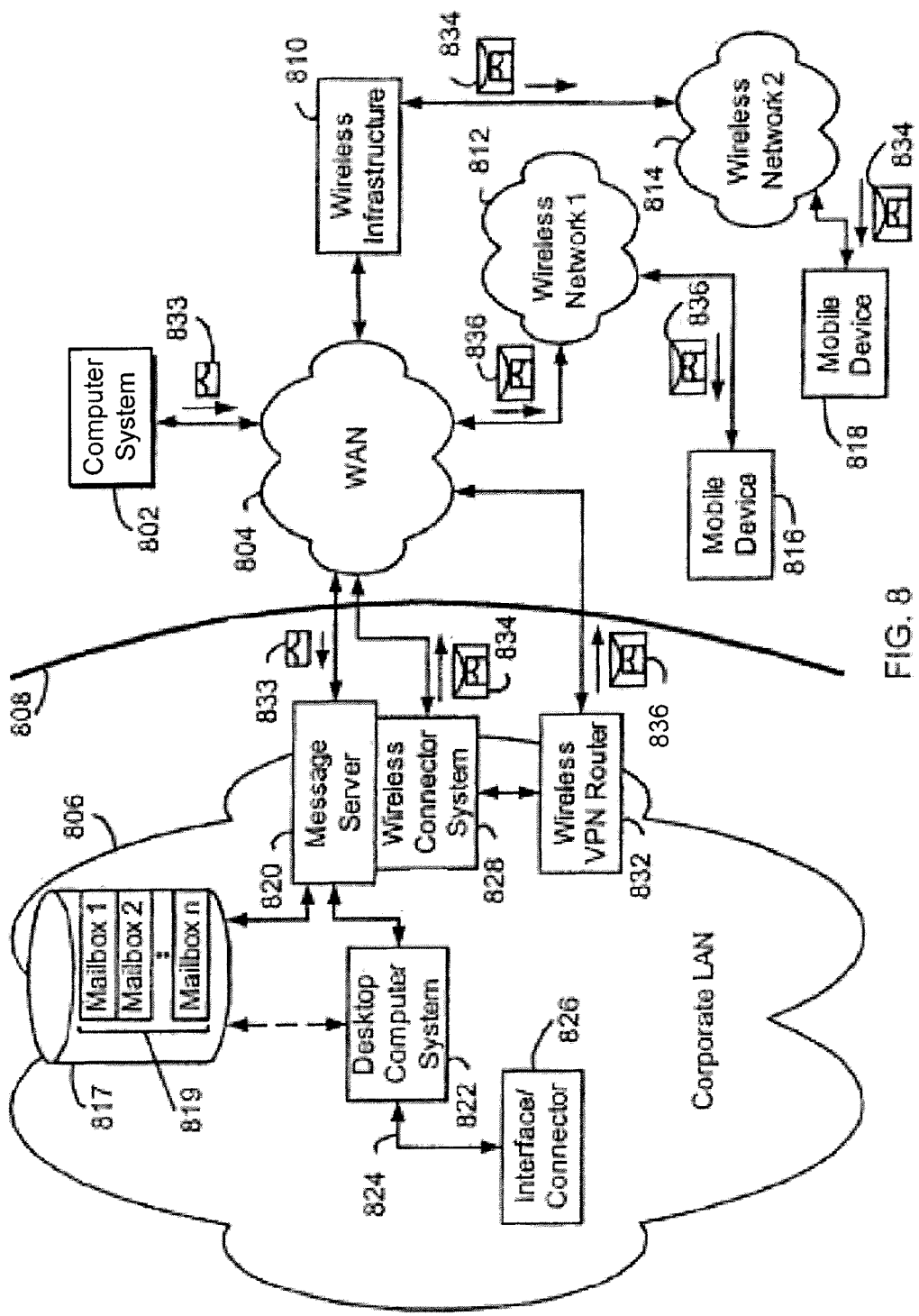
FIG. 8 is a block diagram showing a communication system.
Figure 9:
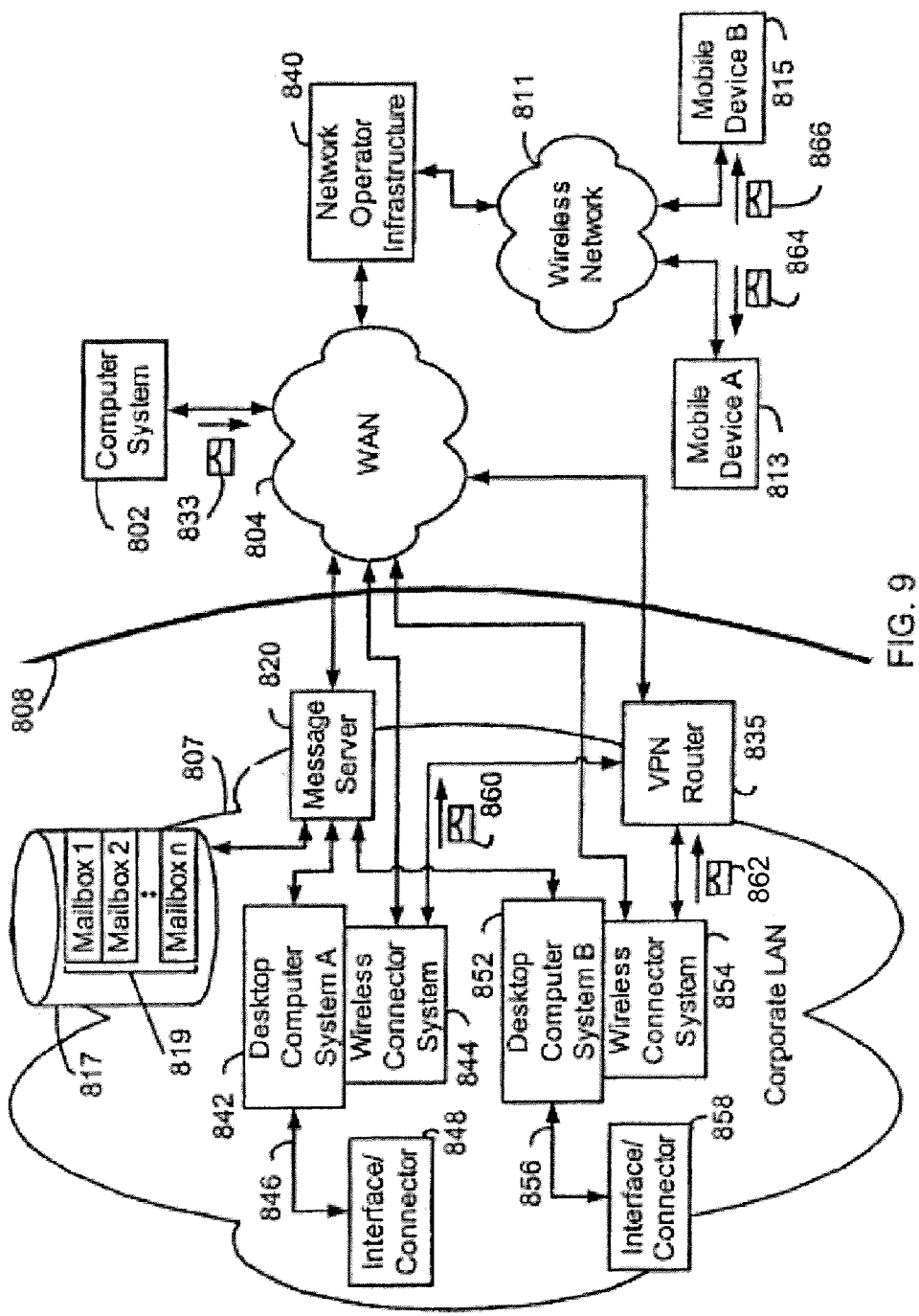
FIG. 9 is a block diagram of an alternative communication system.
Figure 10:
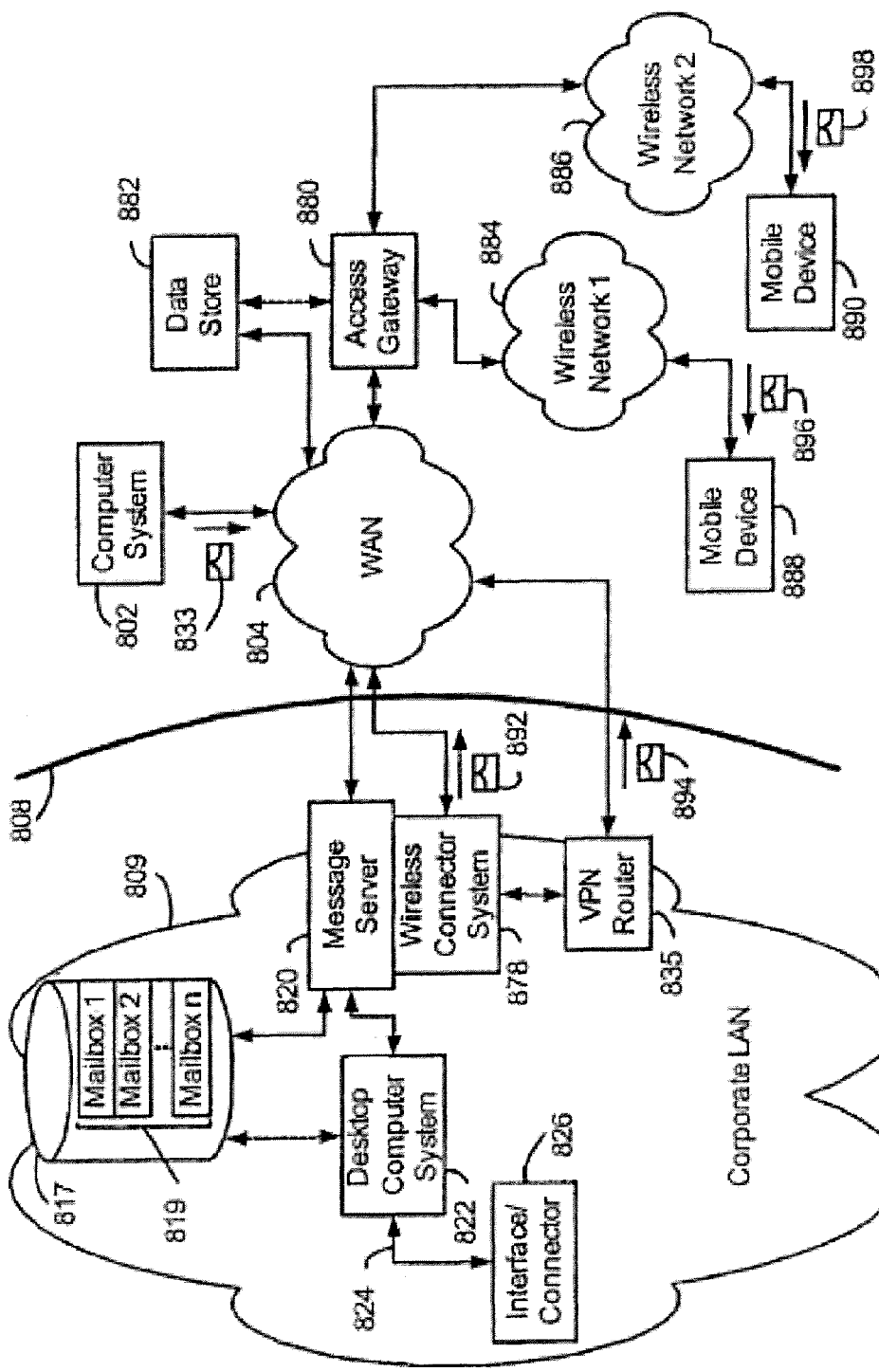
FIG. 10 is a block diagram of another alternative communication system.

Still further examples of the wide scope of the systems and methods disclosed herein are illustrated in FIGS. 8-10. FIGS. 8-10 describe additional uses of the systems and methods within different exemplary communication systems.

FIG. 8 is a block diagram showing a communication system. In FIG. 8, there is shown a computer system 802, a WAN 804, corporate LAN 806 behind a security firewall 808, wireless infrastructure 810, wireless networks 812 and 814, and mobile devices 816 and 818. The corporate LAN 806 includes a message server 820, a wireless connector system 828, a data store 817 including at least a plurality of mailboxes 819, a desktop computer system 822 having a communication link directly to a mobile device such as through physical connection 824 to an interface or connector 826, and a wireless VPN router 832. Operation of the system in FIG. 8 is described below with reference to the messages 833, 834 and 836.

The computer system 802 is, for example, a laptop, desktop or palmtop computer system configured for connection to the WAN 804. Such a computer system may connect to the WAN 804 via an ISP or ASP. Alternatively, the computer system 802 may be a network-connected computer system that, like the computer system 822 for example, accesses the WAN 804 through a LAN or other network. Many modern mobile devices are enabled for connection to a WAN through various infrastructure and gateway arrangements, so that the computer system 802 may also be a mobile device.

The corporate LAN 806 is an illustrative example of a central, server-based messaging system that has been enabled for wireless communications. The corporate LAN 806 may be referred to as a "host system", in that it hosts both a data store 817 with mailboxes 819 for messages, as well as possibly further data stores (not shown) for other data items, that may be sent to or received from mobile devices 816 and 818, and the wireless connector system 828, the wireless VPN router 832, or possibly other components enabling communications between the corporate LAN 806 and one or more mobile devices 816 and 818. In more general terms, a host system is one or more computers at, with, or in association with which a wireless connector system is operating. The corporate LAN 806 is one preferred embodiment of a host system, in which the host system is a server computer running within a corporate network environment operating behind and protected by at least one security communications firewall 808. Other possible central host systems include ISP, ASP and other service provider or mail systems. Although the desktop computer system 824 and interface/connector 826 may be located outside such host systems, wireless communication operations may be similar to those described below.

The corporate LAN 806 implements the wireless connector system 828 as an associated wireless communications enabling component, which will normally be a software program, a software-application, or a software component built to work with at least one message server 820. The wireless connector system 828 is used to send user-selected information to and to receive information from, one or more mobile devices 816 and 818, via one or more wireless networks 812 and 814. The wireless connector system 828 may be a separate component of a messaging system, as shown in FIG. 8, or may instead be partially or entirely incorporated into other communication system components. For example, the message server 820 may incorporate a software program, application, or component implementing the wireless connector system 828, portions thereof, or some or all of its functionality.

The message server 820, running on a computer behind the firewall 808, acts as the main interface for the corporation to exchange messages, including for example electronic mail, calendaring data, voice mail, electronic documents, and Other PIM data with a WAN 804, such as the Internet. The particular intermediate operations and computers are dependent upon the specific type of message delivery mechanisms and networks via which messages are exchanged, and therefore have not been shown in FIG. 8. The functionality of the message server 820 may extend beyond message sending and receiving, providing such features as dynamic database storage for data like calendars, to-do lists, task lists, e-mail, and documentation, as described above.

Message servers such as 820 normally maintain a plurality of mailboxes 819 in one or more data stores such as 817 for each user having an account on the server. The data store 817 includes mailboxes 819 for a number ("n") of user accounts. Messages received by the message server 820 that identify a user, a user account, a mailbox, or possibly another address associated with a user, account or mailbox 819, as a message recipient is typically stored in the corresponding mailbox 819. If a message is addressed to multiple recipients or a distribution list, then copies of the same message may be stored to more than one mailbox 819. Alternatively, the message server 820 may store a single copy of such a message in a data store accessible to all of the users having an account on the message server 820, and store a pointer or other identifier in each recipient's mailbox 819. In typical messaging systems, each user then accesses his or her mailbox 819 and its contents using a messaging client such as Microsoft Outlook or Lotus Notes, which normally operates on a PC, such as the desktop computer system 822, connected in the LAN 806. Although only one desktop computer system 822 is shown in FIG. 8, those skilled in the art will appreciate that a LAN typically contains many desktop, notebook, and laptop computer systems. Each messaging client normally accesses a mailbox 819 through the message server 820, although in some systems, a messaging client may enable direct access to the data store 817 and a mailbox 819 stored thereon by the desktop computer system 822. Messages may also be downloaded from the data store 817 to a local data store on the desktop computer system 822.

Within the corporate LAN 806, the wireless connector system 828 operates in conjunction with the message server 820. The wireless connector system 828 may reside on the same computer system as the message server 820, or may instead be implemented on a different computer system. Software implementing the wireless connector system 828 may also be partially or entirely integrated with the message server 820. The wireless connector system 828 and the message server 820 are preferably designed to cooperate and interact to allow the pushing of information to the mobile devices 816, 818. In such an installation, the wireless connector system 828 is preferably configured to send information that is stored in one or more data stores associated with the corporate LAN 806 to one or more of the mobile devices 816, 818, through the corporate firewall 808 and via the WAN 804 and one of the wireless networks 812, 814. For example, a user that has an account and associated mailbox 819 in the data store 817 may also have a mobile device, such as 816. As described above, messages received by the message server 820 that identify a user, account, or mailbox 819 are stored to a corresponding mailbox 819 by the message server 820. If a user has a mobile device, such as 816, messages received by the message server 820 and stored to the user's mailbox 819 are preferably detected by the wireless connector system 828 and sent to the user's mobile device 816. This type of functionality represents a "push" message sending technique. The wireless connector system 828 may instead employ a "pull" technique, in which items stored in a mailbox 819 are sent to a mobile device 816 or 818 responsive to a request or access operation made using the mobile device, or some combination of both techniques.

The use of a wireless connector 828 thereby-enables a messaging system including a message server 820 to be extended so that each user's mobile device 816, 818 has access to stored messages of the message server 820. Although the systems and methods described herein are not restricted solely to a push-based technique, a more detailed description of push-based messaging may be found in the United States Patent and incorporated by reference above. This push technique uses a wireless friendly encoding, compression and encryption technique to deliver all information to a mobile device, thus effectively extending the company firewall 808 to include the mobile devices 816 and 818.

As shown in FIG. 8, there are several paths for exchanging information with a mobile device 816, 818 from the corporate LAN 806. One possible information transfer path is through the physical connection 824 such as a serial port, using an interface or connector 826. This path is useful for example for bulk information updates often performed at initialization of a mobile device 816, 818 or periodically when a user of a mobile device 816, 818 is working at a computer system in the LAN 806, such as the computer system 822. For example, as described above, PIM data is commonly exchanged over a such a connection as a serial port connected to a cradle in or upon which a mobile device 816, 818 may be placed. The physical connection 824 may also be used to transfer other information from a desktop computer system 822 to a mobile device 816, 818, including private security keys ("private keys") such as private encryption or digital signature keys associated with the desktop computer system 822, or other relatively bulky information such as digital certificates and CRLs.

Private key exchange using the physical connection 824 and the connector or interface 826 allows a user's desktop computer system 822 and mobile device 816 or 818 to share at least one identity for accessing all encrypted and/or signed mail. The user's desktop computer system 822 and mobile device 816 or 818 can also thereby share private keys so that either the host system 822 or the mobile device 816 or 818 can process secure messages addressed to the user's mailbox or account on the message server 820. The transfer of digital certificates and CRLs over such a physical connection is desirable in that they represent a large amount of the data that is required for S/MIME, PGP and other public key security methods. A user's own digital certificate, a chain of digital certificates used to verify the user's digital certificate, and a CRL, as well as digital certificates, digital certificate chains and CRLs for other users, may be loaded onto a mobile device 816, 818 from the user's desktop computer system 822. This loading of other user's digital certificates and CRLs onto a mobile device 816, 818 allows a mobile device user to select other entities or users with whom they might be exchanging secure messages, and to pre-load the bulky information onto the mobile device through a physical connection instead of over the air, thus saving time and wireless bandwidth when a secure message is received from or to be sent to such other users, or when the status of a digital certificate is to be determined based on one or more CRLs. CRL-based status checks can also be avoided where the systems and methods described herein are employed.

In known "synchronization" type wireless messaging systems, a physical path has also been used to transfer messages from mailboxes 819 associated with a message server 820 to mobile devices 816 and 818.

Another method for data exchange with the mobile devices 816 and 818 is over-the-air, through the wireless connector system. 828 and using the wireless networks 812 and 814. As shown in FIG. 8, this could involve a Wireless VPN router 832, if available in the network 806, or, alternatively, a traditional WAN connection to wireless infrastructure 810 that provides an interface to one or more wireless networks such as 814. The Wireless VPN router 832 provides for creation of a VPN connection directly through a specific wireless network 812 to a wireless device 816. Such a Wireless VPN router 832 may be used in conjunction with a static addressing scheme. For example, if the wireless network 812 is an IP-based wireless network, then IPV6 would provide enough IP addresses to dedicate an IP address to every mobile device 816 configured to operate within the network 812 and thus make it possible to push information to a mobile device 816 at any time. A primary advantage of using a wireless VPN router 832 is that it could be an off-the-shelf VPN component which would not require wireless infrastructure 810. A VPN connection may use a TCP/IP or UDP/IP connection to deliver messages directly to and from a mobile device 816.

If a wireless VPN router 832 is not available, then a link to a WAN 804, normally the Internet, is a commonly used connection mechanism that may be employed by the wireless connector system 828. To handle the addressing of the mobile device 816 and any other required interface functions, wireless infrastructure 810 is preferably used. The wireless infrastructure 810 may also determine a most likely wireless network for locating a given user and track users as they roam between countries or networks. In wireless networks such as 812 and 814, messages are normally delivered to and from mobile devices via RF transmissions between base stations and the mobile devices.

A plurality of connections to wireless networks 812 and 814 may be provided, including, for example, ISDN, Frame Relay or T1 connections using the TCP/IP protocol used throughout the Internet. The wireless networks 812 and 814 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure, such as any of those described above.

In some implementations, more than one over-the-air information exchange mechanism may be provided in the corporate LAN 806. In FIG. 8 for example, the mobile devices 816 and 818 associated with users having mailboxes 819 associated with user accounts on the message server 820 are configured to operate on different wireless networks 812 and 814. If the wireless network 812 supports IPv6 addressing, then the wireless VPN router 832 may be used by the wireless connector system 828 to exchange data with any mobile device 816 operating within the wireless network 812. The wireless network 814 may be a different type of wireless network, however, such as the Mobitex network, in which case information is instead exchanged with the mobile device 818 operating within the wireless network 814 via a connection to the WAN-804 and the wireless infrastructure 810.

Operation of the system in FIG. 8 will now be described using an example of an e-mail message 833 sent from the computer system 802 and addressed to at least one recipient having both an account and mailbox 819 or like data store associated with the message server 820 and a mobile device 816 or 818. However, the e-mail message 833 is intended for illustrative purposes only. The exchange of other types of information between the corporate LAN 806 is preferably also enabled by the wireless connector system 828.

The e-mail message 833, sent from the computer system 802 via the WAN 804, may be fully in the clear, or signed with a digital signature and/or encrypted, depending upon the particular messaging scheme used. For example, if the computer system 802 is enabled for secure messaging using S/MIME, then the e-mail message 833 may be signed, encrypted, or both.

E-mail messages such as 833 normally use traditional SMTP, RFC822 headers and MIME body parts to define the format of the e-mail message. These techniques are all well known to one in the art. The e-mail message 833 arrives at the message server 820, which determines into which mailboxes 819 the e-mail message 833 should be stored. As described above, a message such as the e-mail message 833 may include a user name, a user account, a mailbox identifier, or other type of identifier that is mapped to a particular account or associated mailbox 819 by the message server 820. For an e-mail message 833, recipients are typically identified using e-mail addresses corresponding to a user account and thus a mailbox 819.

The wireless connector system 828 sends or mirrors, via the wireless network 812 or 814, certain user-selected data items or parts of data items from the corporate LAN 806 to the user's mobile device 816 or 818, preferably upon detecting that one or more triggering events has occurred. A triggering event includes, but is not limited to, one or more of the following: screen saver activation at a user's networked computer system 822, disconnection of the user's mobile device 816 or 818 from the interface 826, or receipt of a command sent from a mobile device 816 or 818 to the host system to start sending one or more messages stored at the host system. Thus, the wireless connector system 828 may detect triggering events associated with the message server 820, such as receipt of a command, or with one or more networked computer systems 822, including the screen saver and disconnection events described above. When wireless access to corporate data for a mobile device 816 or 818 has been activated at the LAN 806, for example when the wireless connector system 828 detects the occurrence of a triggering event for a mobile device user, data items selected by the user are preferably sent to the user's mobile device. In the example of the e-mail message 833, assuming that a triggering event has been detected, the arrival of the message 833 at the message server 820 is detected by the wireless connector system 828. This may be accomplished, for example, by monitoring or querying mailboxes 819 associated with the message server 820, or, if the message server 820 is a Microsoft Exchange server, then the wireless connector system 828 may register for advise syncs provided by the Microsoft Messaging Application Programming Interface (MAPI) to thereby receive notifications when a new message is stored to a mailbox 819.

When a data item such as the e-mail message 833 is to be sent to a mobile device 816 or 818, the wireless connector system 828 preferably repackages the data item in a manner that is transparent to the mobile device 816 or 818, so that information sent to and received by the mobile device 816 or 818 appears similar to the information as stored on and accessible at the host system, LAN 806 in FIG. 8. One preferred repackaging method includes wrapping received messages to be sent via a wireless network 812 or 814 in an electronic envelope that corresponds to the wireless network address of the mobile device 816 or 818 to which the message is to be sent. Alternatively, other repackaging methods could be used, such as special-purpose TCP/IP wrapping techniques. Such repackaging preferably also results in e-mail messages sent from a mobile device 816 or 818 appearing to come from a corresponding host system account or mailbox 819 even though they are composed and sent from a mobile device. A user of a mobile device 816 or 818 may thereby effectively share a single e-mail address between a host system account or mailbox 819 and the mobile device.

Repackaging of the e-mail message 833 is indicated at 834 and 836. Repackaging techniques may be similar for any available transfer paths or may be dependent upon the particular transfer path, either the wireless infrastructure 810 or the wireless VPN router 832. For example, the e-mail message 833 is preferably compressed and encrypted, either before or after being repackaged at 834, to thereby provide for secure transfer to the mobile device 818. Compression reduces the bandwidth required to send the message, whereas encryption ensures confidentiality of any messages or other information sent to the mobile devices 816 and 818. In contrast, messages transferred via a VPN router 832 might only be compressed and not encrypted, since a VPN connection established by the VPN router 832 is inherently secure. Messages are thereby securely sent, via either encryption at the wireless connector system 828, which may be considered a non-standard VPN tunnel or a VPN-like connection, for example, or the VPN router 832, to mobile devices 816 and 818. Accessing messages using a mobile device 816 or 818 is thus no less secure than accessing mailboxes at the LAN 806 using the desktop computer system 822.

When a repackaged message 834 or 836 arrives at a mobile device 816 or 818, via the wireless infrastructure 810, or via the wireless VPN router 832, the mobile device 816 or 818 removes the outer electronic envelope from the repackaged message 834 or 836, and performs any required decompression and decryption operations. Messages sent from a mobile device 816 or 818 and addressed to one or more recipients are preferably similarly repackaged, and possibly compressed and encrypted, and sent to a host system such as the LAN 806. The host system may then remove the electronic envelope from the repackaged message, decrypt and decompress the message if desired, and route the message to the addressed recipients.

Another goal of using an outer envelope is to maintain at least some of the addressing information in the original e-mail message 833. Although the outer envelope used to route information to mobile devices 816, 818 is addressed using a network address of one or more mobile devices, the outer envelope preferably encapsulates the entire original e-mail message 833, including at least one address field, possibly in compressed and/or encrypted form. This allows original "To", "From" and "CC" addresses of the e-mail message 833 to be displayed when the outer envelope is removed and the message is displayed on a mobile device 816 or 818. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 828. Using the user's account or mailbox address from the mobile device 816 or 818 allows a message sent from a mobile device to appear as though the message originated from the user's mailbox 819 or account at the host system rather than the mobile device.

FIG. 9 is a block diagram of an alternative communication system, in which wireless communications are enabled by a component associated with an operator of a wireless network. As shown in FIG. 9, the system includes a computer system 802, WAN 804, a corporate LAN 807 located behind a security firewall 808, network operator infrastructure 840, a wireless network 811, and mobile devices 813 and 815. The computer system 802, the WAN 804, the security firewall 808, the message server 820, the data store 817, the mailboxes 819, and the VPN router 835 are substantially the same as the similarly-labelled components in FIG. 8. However, since the VPN router 835 communicates with the network operator infrastructure 840, it need not necessarily be a wireless VPN router in the system of FIG. 9. The network operator infrastructure 840 enables wireless information exchange between the LAN 807 and the mobile devices 813 and 815, respectively associated with the computer systems 842 and 852 and configured to operate within the wireless network 811. In the LAN 807, a plurality of desktop computer systems 842 and 852 are shown, each having a physical connection 846 or 856 to an interface or connector 848 or 858. A wireless connector system 844 or 854 is operating on or in conjunction with each computer system 842 and 852.

The wireless connector systems 844 and 854 are similar to the wireless connector system 828 described above, in that they enable data items, such as e-mail messages and other items that are stored in mailboxes 819, and possibly data items stored in a local or network data store, to be sent from the LAN 807 to one or more of the mobile devices 813 and 815. In FIG. 9 however, the network operator infrastructure 840 provides an interface between the mobile devices 813 and 815 and the LAN 807. As above, operation of the system shown in FIG. 9 is described below in the context of an e-mail message as an illustrative example of a data item that may be sent to a mobile device 813 or 815.

When an e-mail message 833, addressed to one or more recipients having an account on the message server 820, is received by the message server 820, the message, or possibly a pointer to a single copy of the message stored in a central mailbox or data store, is stored in the mailbox 819 of each such recipient. Once the e-mail message 833 or pointer has been stored to a mailbox 819, it may preferably be accessed using a mobile device 813 or 815. In the example shown in FIG. 9, the e-mail message 833 has been addressed to the mailboxes 819 associated with both desktop computer systems 842 and 852 and thus both mobile devices 813 and 815.

As those skilled in the art will appreciate, communication network protocols commonly used in wired networks such as the LAN 807 and/or the WAN 804 are not suitable or compatible with wireless network communication protocols used within wireless networks such as 811. For example, communication bandwidth, protocol overhead, and network latency, which are primary concerns in wireless network communications, are less significant in wired networks, which typically have much higher capacity and speed than wireless networks. Therefore, mobile devices 813 and 815 cannot normally access the data store 817 directly. The network operator infrastructure 840 provides a bridge between the wireless network 811 and the LAN 807.

The network operator infrastructure 840 enables a mobile device 813 or 815 to establish a connection to the LAN 807 through the WAN 804, and may, for example, be operated by an operator of the wireless network 811 or a service provider that provides wireless communication service for mobile devices 813 and 815. In a pull-based system, a mobile device 813 or 815 establishes a communication session with the network operator infrastructure 840 using a wireless network compatible communication scheme, preferably a secure scheme such as Wireless Transport Layer Security (WTLS) when information should remain confidential, and a wireless web browser such as a Wireless Application Protocol (WAP) browser. A user then requests, through manual selection or pre-selected defaults in the software residing in the mobile device, any or all information, or just new information, for example, stored in a mailbox 819 in the data store 817 at the LAN 807. The network operator infrastructure 840 establishes a connection or session with a wireless connector system 844, 854, using Secure Hypertext Transfer Protocol (HTTPS), for example, if no session has already been established. As above, a session between the network operator infrastructure 840 and a wireless connector system 844 or 854 may be made via a typical WAN connection or through the VPN router 835 if available. When time delays between receiving a request from a mobile device 813 or 815 and delivering requested information back to the device are to be minimized, the network operator infrastructure 840 and the wireless connector systems 844 and 854 may be configured so that a communication connection remains open once established.

In the system of FIG. 9, requests originating from mobile device A 813 and B 815 would be sent to the wireless connector systems 844 and 854, respectively. Upon receiving a request for information from the network operator infrastructure 840, a wireless connector system 844 or 854 retrieves requested information from a data store. For the e-mail message 833, the wireless connector system 844 or 854 retrieves the e-mail message 833 from the appropriate mailbox 819, typically through a messaging client operating in conjunction with the computer system 842 or 852, which may access a mailbox 819 either via the message server 820 or directly. Alternatively, a wireless connector system 844 or 854 may be configured to access mailboxes 819 itself, directly or through the message server 820. Also, other data stores, both network data stores similar to the data store 817 and local data stores associated with each computer system 842 and 852, may be accessible to a wireless connector system 844 or 854, and thus to a mobile device 813 or 815.

If the e-mail message 833 is addressed to the message server accounts or mailboxes 819 associated with both computer systems 842 and 852 and devices 813 and 815, then the e-mail message 833 is sent to the network operator infrastructure 840 as shown at 860 and 862, which then sends a copy of the e-mail message to each mobile device 813 and 815, as indicated at 864 and 866. Information is transferred between the wireless connector systems 844 and 854 and the network operator infrastructure 840 via either a connection to the WAN 804 or the VPN router 835. When the network operator infrastructure 840 communicates with the wireless connector systems 844 and 854 and the mobile devices 813 and 815 via different protocols, translation operations may be performed by the network operator infrastructure 840. Repackaging techniques may also be used between the wireless connector systems 844 and 854 and the network operator infrastructure 840, and between each mobile device 813 and 815 and the network operator infrastructure 840.

Messages or other information to be sent from a mobile device 813 or 815 may be processed in a similar manner, with such information first being transferred from a mobile device 813 or 815 to the network operator infrastructure 840. The network operator infrastructure 840 then sends the information to a wireless connector system 844 or 854 for storage in a mailbox 819 and delivery to any addressed recipients by the message server 820, for example, or may alternatively deliver the information to the addressed recipients.

The above description of the system in FIG. 9 relates to pull-based operations. The wireless connector systems 844 and 854 and the network operator infrastructure may instead be configured to push data items to mobile devices 813 and 815. A combined push/pull system is also possible. For example, a notification of a new message or a list of data items currently stored in a data store at the LAN 807 could be pushed to a mobile device 813 or 815, which may then be used to request messages or data items from the LAN 807 via the network operator infrastructure 840.

If mobile devices associated with user accounts on the LAN 807 are configured to operate within different wireless networks, then each wireless network may have an associated wireless network infrastructure component similar to 840.

Although separate, dedicated wireless connector systems 844 and 854 are shown for each computer system 842 and 852 in the system of FIG. 9, one or more of the wireless connector systems 844 and 854 is preferably configured to operate in conjunction with more than one of the computer systems 842 and 852, or to access a data store or mailbox 819 associated with more than one computer system. For example, the wireless connector system 844 may be granted access to the mailboxes 819 associated with both the computer system 842 and the computer system 852. Requests for data items from either mobile device A 813 or B 815 are then processed by the wireless connector system 844. This configuration is useful to enable wireless communications between the LAN 807 and the mobile devices 813 and 815 without requiring a desktop computer system 842 and 852 to be running for each mobile device user. A wireless connector system may instead be implemented in conjunction with the message server 820 to enable wireless communications.

FIG. 10 is a block diagram of another alternative communication system. The system includes a computer system 802, WAN 804, a corporate LAN 809 located behind a security firewall 808, an access gateway 880, a data store 882, wireless networks 884 and 886, and mobile devices 888 and 890. The computer system 802, the WAN 804, the security firewall 808, the message server 820, the data store 817, the mailboxes 819, the desktop computer system 822, the physical connection 824, the interface or connector 826 and the VPN router 835 are substantially the same as the corresponding components described above. The access gateway 880 and data store 882 provide mobile devices 888 and 890 with access to data items stored at the LAN 809. In FIG. 10, a wireless connector system 878 operates on or in conjunction with the message server 820, although a wireless connector system may instead operate on or in conjunction with one or more desktop computer systems 822 in the LAN 809.

The wireless connector system 878 provides for transfer of data items stored at the LAN 809 to one or more of the mobile devices 888 and 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 are stored into the mailbox 819 of each such recipient. In the system of FIG. 10, the external data store 882 preferably has a similar structure to and remains synchronized with, the data store 817. PIM information or data stored at data store 882 preferably is independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888 or 890 through the access gateway 880.

In the case of the e-mail message 833, for example, an update sent to the data store 882 some time after the e-mail message 833 is received indicates that the message 833 has been stored in a certain mailbox 819 in the store 817, and a copy of the e-mail message is stored to a corresponding storage area in the data store 882. When the e-mail message 833 has been stored in the mailboxes 819 corresponding to the mobile devices 888 and 890, one or more copies of the e-mail message, indicated at 892 and 894 in FIG. 10, will be sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as HTTPS or Secure Sockets Layer (SSL) may be used. Those skilled in the art will appreciate that a single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 connect to the WAN 804. A WAP browser or other browser compatible with the wireless networks 884 and 886 may then be used to access the data store 882, which is synchronized with the data store 817, and download stored data items either automatically or responsive to a request from a mobile device 888 or 890. As shown at 896 and 898, copies of the e-mail message 833, which was stored in the data store 817, are sent to the mobile devices 888 and 890. A data store on each mobile device 888 and 890 is thereby synchronized with a portion, such as a mailbox 819, of a data store 817 on a corporate LAN 809. Changes to a mobile device data store are similarly reflected in the data stores 882 and 817.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A system for determining a status of a digital certificate from status data stored in a status provider system comprising:

a client system comprising a client module, the client module operable to generate and provide status request data corresponding to a status request for the digital certificate for transmission from the client system, and to receive digital certificate status data for the digital certificate in response to the status request; and a proxy system comprising a proxy module, the proxy module operable to receive the status request data transmitted from the client system and, in response thereto, generate query data for the digital certificate status and provide the query data for transmission from the proxy system to the status provider system, and further operable to receive the status data from the status provider system, generate the digital certificate status data based on the status data received, and provide the digital certificate status data for transmission to the client system;

wherein the client system comprises a mobile device including a memory subsystem and operable to communicate with the proxy system over a wireless network, to receive data items over the wireless network, and to store the data items in the memory subsystem;

wherein the digital certificate status data comprises validity period data indicating a validity period for the digital certificate, and wherein the client module is further operable to periodically generate and provide status request data corresponding to a status request for transmission to the proxy system during the validity period of the digital certificate;

wherein the status request data is generated at the client system at predetermined times spaced at predetermined intervals or at user-configurable intervals; and wherein the proxy system is operable to redirect a data item to the mobile device, and the proxy module is further operable to determine whether the data item includes a transmitted digital certificate and, upon a determination that the data item includes the transmitted digital certificate, to generate and provide status request data corresponding to a status request for the transmitted digital certificate for transmission to the status provider system, and to receive digital certificate status data for the transmitted digital certificate in response to the status request, and the proxy system is further operable to communicate with a plurality of status providers, thereby allowing the proxy system to redirect data items from the plurality of status providers to the mobile device.

2. The system of claim 1, wherein the digital certificate status data comprises a subset of the status data received from the status provider system.

3. The system of claim 2, wherein the status request data comprises a subset of the query data.

4. The system of claim 3, wherein the query data comprises an Online Certificate Status Protocol (OCSP) query.

5. The system of claim 2, wherein the digital certificate comprises a digital certificate chain of digital certificates, and wherein the status request data comprises data corresponding to each digital certificate in the digital certificate chain.

6. The system of claim 1, wherein the digital certificate status data transmitted from the proxy system comprises a valid indicator; a revoked indicator, and an unknown indicator.

7. The system of claim 1, wherein the digital certificate is used to encode an outgoing message prior to sending of the message from the mobile device.

8. The system of claim 1, wherein the proxy system is separate from the status provider system.

9. A method for handling digital certificate status request between a client system and a proxy system, the method comprising the acts of:

receiving at the proxy system digital certificate status request data transmitted from the client system;

generating query data for the digital certificate status in response to receiving the digital certificate status request data;

transmitting the query data to a status provider system;

receiving at the proxy system status data from the status provider system in response to the query data;

generating digital certificate status data based on the status data received; and transmitting the digital certificate status data to the client system;

wherein the client system comprises a mobile device including a memory subsystem and operable to communicate with the proxy system over a wireless network, to receive data items over the wireless network, and to store the data items in the memory subsystem;

wherein the digital certificate status data comprises validity period data indicating a validity period for the digital certificate, and wherein the client module is further operable to periodically generate and provide status request data corresponding to a status request for transmission to the proxy system during the validity period of the digital certificate;

wherein the status request data is generated at the client system at predetermined times spaced at predetermined intervals or at user-configurable intervals; and wherein the proxy system is operable to redirect a data item to the mobile device, and the proxy module is further operable to determine whether the data item includes a transmitted digital certificate and, upon a determination that the data item includes the transmitted digital certificate, to generate and provide status request data corresponding to a status request for the transmitted digital certificate for transmission to the status provider system, and to receive digital certificate status data for the transmitted digital certificate in response to the status request, and the proxy system is further operable to communicate with a plurality of status providers, thereby allowing the proxy system to redirect data items from the plurality of status providers to the mobile device.

10. The method of claim 1, wherein the proxy system receives the status data from the status provider system using communication protocols other than Online Certificate Status Protocol (OCSP).

11. The method of claim 9, wherein the digital certificate status data is a subset of the status data received from the status provider.

12. The method of claim 9, wherein the digital certificate status request data comprises a subset of the query data.

13. The method of claim 12, wherein the query data for the digital certificate status comprises Online Certificate Status Protocol (OCSP) query data.

14. The method of claim 9, wherein the digital certificate is used to encode an outgoing message prior to sending of the message from the mobile device.

15. A system for determining a status of a digital certificate from status data stored in a status provider system comprising:

a client system comprising a client module, the client module operable to generate and provide status request data corresponding to a status request for the digital certificate for transmission from the client system, and to receive digital certificate status data for the digital certificate in response to the status request; and a proxy system comprising a proxy module, the proxy module operable to receive the status request data transmitted from the client system and, in response thereto, generate query data for the digital certificate status and provide the query data for transmission from the proxy system to the status provider system, and further operable to receive the status data from the status provider system, generate the digital certificate status data based on the status data received, and provide the digital certificate status data for transmission to the client system;

wherein the client system comprises a mobile device including a memory subsystem and operable to communicate with the proxy system over a wireless network, to receive data items over the wireless network, and to store the data items in the memory subsystem;

wherein the digital certificate status data comprises validity period data indicating a validity period for the digital certificate, and wherein the client module is further operable to periodically generate and provide status request data corresponding to a status request for transmission to the proxy system during the validity period of the digital certificate;

wherein the status request data is generated at the client system at predetermined times spaced at predetermined intervals or at user-configurable intervals;

wherein the status request data is generated without requiring receipt of a message at the mobile device; and wherein the proxy system is operable to redirect a data item to the mobile device, and the proxy module is further operable to determine whether the data item includes a transmitted digital certificate and, upon a determination that the data item includes the transmitted digital certificate, to generate and provide status request data corresponding to a status request for the transmitted digital certificate for transmission to the status provider system, and to receive digital certificate status data for the transmitted digital certificate in response to the status request, and the proxy system is further operable to communicate with a plurality of status providers, thereby allowing the proxy system to redirect data items from the plurality of status providers to the mobile device.

16. A method for handling digital certificate status request between a client system and a proxy system, the method comprising the acts of:

receiving at the proxy system digital certificate status request data transmitted from the client system;

generating query data for the digital certificate status in response to receiving the digital certificate status request data;

transmitting the query data to a status provider system;

receiving at the proxy system status data from the status provider system in response to the query data;

generating digital certificate status data based on the status data received; and transmitting the digital certificate status data to the client system;

wherein the client system comprises a mobile device including a memory subsystem and operable to communicate with the proxy system over a wireless network, to receive data items over the wireless network, and to store the data items in the memory subsystem;

wherein the digital certificate status data comprises validity period data indicating a validity period for the digital certificate, and wherein the client module is further operable to periodically generate and provide status request data corresponding to a status request for transmission to the proxy system during the validity period of the digital certificate;

wherein the status request data is generated at the client system at predetermined times spaced at predetermined intervals or at user-configurable intervals;

wherein the status request data is generated without requiring receipt of a message at the mobile device; and wherein the proxy system is operable to redirect a data item to the mobile device, and the proxy module is further operable to determine whether the data item includes a transmitted digital certificate and, upon a determination that the data item includes the transmitted digital certificate, to generate and provide status request data corresponding to a status request for the transmitted digital certificate for transmission to the status provider system, and to receive digital certificate status data for the transmitted digital certificate in response to the status request, and the proxy system is further operable to communicate with a plurality of status providers, thereby allowing the proxy system to redirect data items from the plurality of status providers to the mobile device.

* * * * *